US008027391B2

(12) United States Patent
Matsubara et al.

(10) Patent No.: US 8,027,391 B2
(45) Date of Patent: Sep. 27, 2011

(54) DIFFERENTIAL TRANSMISSION LINE CONNECTOR

(75) Inventors: Ryo Matsubara, Osaka (JP); Hirotsugu Fusayasu, Kyoto (JP); Shinichi Tanimoto, Kyoto (JP); Seiji Hamada, Osaka (JP)

(73) Assignee: Panasonic Corporation, Osaka (JP)

( * ) Notice: Subject to any disclaimer, the term of this patent is extended or adjusted under 35 U.S.C. 154(b) by 762 days.

(21) Appl. No.: 12/147,274

(22) Filed: Jun. 26, 2008

(65) Prior Publication Data

US 2009/0003464 A1 Jan. 1, 2009

(30) Foreign Application Priority Data

Jun. 28, 2007 (JP) .................................. 2007-170064

(51) Int. Cl.
*H04B 3/00* (2006.01)
(52) U.S. Cl. .............. 375/257; 341/56; 326/86; 326/90; 333/12
(58) Field of Classification Search .................... 375/257
See application file for complete search history.

(56) References Cited

FOREIGN PATENT DOCUMENTS

| JP | 2001-267701 | 9/2001 |
| JP | 3507687 | 12/2003 |
| JP | 3616874 | 11/2004 |
| JP | 2005-5272 | 1/2005 |
| WO | 01/06602 | 1/2001 |

*Primary Examiner* — Shuwang Liu
*Assistant Examiner* — Lihong Yu
(74) *Attorney, Agent, or Firm* — Wenderoth, Lind & Ponack, L.L.P.

(57) ABSTRACT

A differential transmission line connector with little unwanted radiation noise is provided. A connector connects a differential transmission pattern for multiple transmission of a group of three differential signals and a differential transmission cable. The differential transmission pattern is provided with three signal lines, and the differential transmission cable also is provided with three signal lines. In a plane that is perpendicular to the longitudinal direction of the differential transmission pattern and the differential transmission cable, the signal lines are positioned at the apexes of an equilateral triangle. The connector is provided with three signal lines that connect, at identical lengths, the signal lines of the differential transmission pattern and the signal lines of the differential transmission cable, between a predetermined first plane of the planes that perpendicularly intersect the longitudinal direction of the differential transmission pattern and a predetermined second plane of the planes that perpendicularly intersect the longitudinal direction of the differential transmission cable.

8 Claims, 33 Drawing Sheets first embodiment

| B1 | B2 | B3 | Vs1[V] | Vs2[V] | Vs3[V] |
|---|---|---|---|---|---|
| 0 | 0 | 0 | 0 | 0 | 0 |
| 0 | 0 | 1 | -1 | 0 | 1 |
| 0 | 1 | 0 | 0 | 1 | -1 |
| 0 | 1 | 1 | -1 | -1 | 0 |
| 1 | 0 | 0 | 1 | -1 | 0 |
| 1 | 0 | 1 | 0 | -1 | 1 |
| 1 | 1 | 0 | 1 | 0 | -1 |
| 1 | 1 | 1 | 0 | 0 | 0 |

*Fig. 16*

| B1 | B2 | B3 | polarity of V1 | polarity of V2 | polarity of V3 |
|----|----|----|----|----|----|
| 0 | 0 | 1 | − | − | + |
| 0 | 1 | 0 | − | + | − |
| 0 | 1 | 1 | − | + | + |
| 1 | 0 | 0 | + | − | − |
| 1 | 0 | 1 | + | − | + |
| 1 | 1 | 0 | + | + | − |

Fig. 18

| B1 | B2 | B3 | Vs1[V] | Vs2[V] | Vs3[V] | V1[V] | V2[V] | V3[V] | polarity of V1 | polarity of V2 | polarity of V3 |
|---|---|---|---|---|---|---|---|---|---|---|---|
| 0 | 0 | 0 | 0.25 | 0 | -0.25 | 0.25 | 0.25 | -0.5 | + | + | - |
| 0 | 0 | 1 | -1.25 | 0 | 1.25 | -1.25 | -1.25 | 2.5 | - | - | + |
| 0 | 1 | 0 | 0.25 | 1 | -1.25 | -0.75 | 2.25 | -1.5 | - | + | - |
| 0 | 1 | 1 | -1.25 | 1 | 0.25 | -2.25 | 0.75 | 1.5 | - | + | + |
| 1 | 0 | 0 | 1.25 | -1 | -0.25 | 2.25 | -0.75 | -1.5 | + | - | - |
| 1 | 0 | 1 | -0.25 | -1 | 1.25 | 0.75 | -2.25 | 1.5 | + | - | + |
| 1 | 1 | 0 | 1.25 | 0 | -1.25 | 1.25 | 1.25 | -2.5 | + | + | - |
| 1 | 1 | 1 | -0.25 | 0 | 0.25 | -0.25 | -0.25 | 0.5 | - | - | + |

*Fig. 23*

| B1 | B2 | B3 | Vs1[V] | Vs2[V] | Vs3[V] | V1[V] | V2[V] | V3[V] | polarity of V1 | polarity of V2 | polarity of V3 |
|---|---|---|---|---|---|---|---|---|---|---|---|
| 0 | 0 | 0 | -0.1 | 0 | 0.1 | -0.1 | -0.1 | 0.2 | − | − | + |
| 0 | 0 | 1 | -0.9 | 0 | 0.9 | -0.9 | -0.9 | 1.8 | − | − | + |
| 0 | 1 | 0 | -0.1 | 1 | -0.9 | -1.1 | 1.9 | -0.8 | − | + | − |
| 0 | 1 | 1 | -0.9 | 1 | -0.1 | -1.9 | 1.1 | 0.8 | − | + | + |
| 1 | 0 | 0 | 0.9 | -1 | 0.1 | 1.9 | -1.1 | -0.8 | + | − | − |
| 1 | 0 | 1 | 0.1 | -1 | 0.9 | 1.1 | -1.9 | 0.8 | + | − | + |
| 1 | 1 | 0 | 0.9 | 0 | -0.9 | 0.9 | 0.9 | -1.8 | + | + | − |
| 1 | 1 | 1 | 0.1 | 0 | -0.1 | 0.1 | 0.1 | -0.2 | + | + | − |

*Fig. 27*

DIFFERENTIAL TRANSMISSION LINE CONNECTOR

BACKGROUND OF THE INVENTION

1. Field of the Invention

The present invention relates to differential transmission line connectors for performing multiple differential transmission in which, through the high-speed signal transmission method of differential transmission, the transmission of a plurality of data bits is achieved with a differential transmission line that is provided with few signal lines.

2. Description of the Related Art

Single-end signals that oscillate logically amplitude at the power source voltage have conventionally been used for the transmission of high-speed signals, but the use of low voltage differential signaling (LVDS) has been on the rise due to the increase in the number of drive frequencies and larger bus widths in order to keep up with recent demands for high-speed data transmission, as well as because of its inhibition of unwanted radiation noise and resistance against exogenous noise. With LVDS, generally the differential driver IC is designed such that only a reverse-phase differential mode current flows between the two transmission lines through which the differential signal flows.

FIG. 30 is a circuit diagram of a differential transmission system according to a first conventional technology, and FIG. 31 is a perspective view showing the schematic configuration of the differential transmission system of FIG. 30. The differential transmission system of FIG. 30 illustrates an example of a conventional LVDS interface configuration. As shown in FIG. 31, a differential driver IC911 is provided on a printed circuit board 916 and a differential receiver IC913 is provided on another printed circuit board 917 that is away from the printed circuit board 916, and the differential driver IC911 and the differential receiver IC913 are connected by a differential transmission cable 912 that serves as a differential transmission line that is provided with a positive signal line 912a and a negative signal line 912b. Here, one end of the differential transmission cable 912 is connected to the differential driver IC911 via a connector 914 on the printed circuit board 916, and the other end of the differential transmission cable 912 is connected to the differential receiver IC913 via a connector 915 on the printed circuit board 917 (in FIG. 31, other circuit elements on the printed circuit boards 916 and 917 have been omitted). Thus, a bit information signal that is input to the differential driver IC911 is transferred to the differential receiver IC913 via the differential transmission cable 912 and then output.

In FIG. 30, the positive output terminal of the differential driver IC911 (in FIG. 30, represented by point p1) is connected to the positive input terminal of the differential receiver IC913 via the signal line 912a, and similarly, the negative output terminal of the differential driver IC911 (in FIG. 30, represented by point p2) is connected to the negative input terminal of the differential receiver IC913 via the signal line 912b. To terminate the differential transmission cable 912, the point p3 where it approaches the differential receiver IC913 on the signal line 912a and the point p4 where it approaches the differential receiver IC913 on the signal line 912b are connected by a 100-Ω terminal resistor R. The differential transmission cable 912 has a 50-Ω odd mode impedance. The positive signal line 912a and the negative signal line 912b of the differential transmission cable 912 have equal electrical properties and form equivalent transmission routes, and in LVDS these two signal lines 912a and 912b together effect the transmission of a single bit information signal. Based on the bit information signal that is input from its input terminal, the differential driver IC911 creates a group of differential signals that causes a potential difference between the positive and negative sides of the differential transmission cable 912. More specifically, the differential driver IC911 outputs an approximately 3.5 mA current in order to generate an approximately 350 mV voltage between points p3 and p4 at either end of the 100-Ω terminal resistor R. The differential receiver IC913 detects the approximately 350 mV differential signal that is produced between points p3 and p4 at either end of the terminal resistor R and converts this to a CMOS level (a voltage level about 20 to 40% of the power source voltage; same hereinafter) and outputs the converted bit information signal from the output terminal.

In LVDS, the signal currents Is that flow through the positive signal line 912a and the negative signal line 912b of the differential transmission cable 912 are the same size and are in opposite directions, and thus unwanted radiation noise and crosstalk noise are prevented by the magnetic fields that are produced by these moving currents canceling each other out, and also because the signal level is small. With regard to exogenous noise also, as long as the positive and negative sides of the differential transmission cable 912 are affected relatively equally, then there is no effect on the logic value of the signal, and thus LVDS has excellent noise resistance as well. However, the flow of a tiny in-phase common mode current to the differential transmission cable 912 occurs in LVDS, as well as due to the printed circuit board, differential impedance mismatching in the differential transmission line, such as the transmission cable, or the end terminal circuit, and skewing between the signal lines 912a and 912b of the differential transmission cable 912. In the differential transmission cable 912 of FIG. 30, the differential mode current component is matched by the terminal resistor R and terminated, but there is no route for the common mode current component to flow over the circuit, and it returns via stray capacitance on the printed circuit boards 916 and 917, for example. Thus, the common mode current component that is generated in the differential transmission cable 912 was the primary source of unwanted radiation noise that radiates from an LVDS transmission system. In order to solve this issue, the two signal lines 912a and 912b are laid out parallel to and near one another as shown in FIG. 31, preventing differential impedance mismatching (for example, see Japanese Laid-Open Patent Publication No. 2001-267701). With this method, the common mode current that flows to the differential transmission cable 912, which is made from the two signal lines 912a and 912b, is inhibited, allowing transmission noise and unwanted radiation noise to be inhibited.

However, although compared to ordinary single-end transmission, the differential transmission system of FIGS. 30 and 31 has the numerous above-described merits with regard to high-speed transmission, it requires the two signal lines 912a and 912b in order to transmit a single data bit, and this leads to problems such as more signal lines in order to achieve multiple bit transmission, a thick differential transmission cable 912, and a larger wiring region on the printed circuit boards 916 and 917. One method that has been conceived for solving this problem is the use of three signal lines, with one of the signal lines serving as a complementary data line, in order to achieve the transmission of two data bits with three signal lines, which required four signal lines in conventional differential transmission (for example, see Japanese Patent No. 3507687).

FIG. 32 is a perspective view that schematically shows the configuration of the differential transmission system according to a second conventional technology, and FIG. 33 is a horizontal cross section of the differential transmission cable 912A in FIG. 32. A differential driver IC911A and a differential receiver IC913A are connected by a differential transmission cable 912A, which is made of three signal lines 912a, 912b, and 912c. Here, one end of the differential transmission cable 912A is connected to the differential driver IC911A via a connector 914A on the printed circuit board 916, and the other end of the differential transmission cable 912A is connected to the differential receiver IC913A via a connector 915A on the printed circuit board 917. A first bit information signal that is input to the differential driver IC911A is transmitted to the differential receiver IC913A over the signal lines 912a and 912b, and similarly, a second bit information signal that is input to the differential driver IC911A is transmitted to the differential receiver IC913A over the signal lines 912b and 912c. A terminal resistor for terminating the signal lines 912a and 912b, and a terminal resistor for terminating the signal lines 912b and 912c, are provided in the differential receiver IC913A. When the three signal lines 912a, 912b, and 912c of the differential transmission cable 912A are disposed as shown in FIG. 33, the distances between the two adjacent signal lines 912a and 912b, and 912b and 912c, and the signal lines 912a and 912c on the sides, are different (L51≠L53, L52≠L53), and this creates a novel problem in that the electromagnetic fields between the signals that are transmitted cannot cancel each other out because the differential impedance cannot be kept constant, and unwanted radiation noise cannot be reduced.

SUMMARY OF THE INVENTION

It is an object of the invention to solve the foregoing issues by providing a differential transmission line connector that is provided with three signal lines and that is for connecting differential transmission cables that differentially transmit a plurality of signals, and in which there is little unwanted radiation noise.

A differential transmission line connector according to a first aspect of the invention is a differential transmission line connector that is used in a multiple differential transmission system and is provided with a signal transmitter and a signal receiver, and is for connecting first and second differential transmission lines that are each provided with three signal lines and that perform multiple transmission of a group of three differential signals.

In a plane that perpendicularly intersects the longitudinal direction of the first differential transmission line, the three signal lines of the first differential transmission line are positioned at the apexes of a first triangle;
in a plane that perpendicularly intersects the longitudinal direction of the second differential transmission line, the three signal lines of the second differential transmission line are positioned at the apexes of a second triangle; and
the differential transmission line connector is provided with three signal lines that connect, at identical lengths, the three signal lines of the first differential transmission line and the three signal lines of the second differential transmission line, between a predetermined first plane of the planes that perpendicularly intersect the longitudinal direction of the first differential transmission line and a predetermined second plane of the planes that perpendicularly intersect the longitudinal direction of the second differential transmission line.

The signal transmitter of the multiple differential transmission system is connected to a differential transmission path that has first, second, and third signal lines, and includes a first differential driver, a second differential driver, and a third differential driver.

The first differential driver transmits a first output signal, and an inverted first output signal that is a phase inverted signal of the first output signal, in response to a first bit information signal.

The second differential driver transmits a second output signal, and an inverted second output signal that is a phase inverted signal of the second output signal, in response to a second bit information signal.

The third differential driver transmits a third output signal, and an inverted third output signal that is a phase inverted signal of the third output signal, in response to a third bit information signal.

The signal transmitter of the multiple differential transmission system synthesizes the first output signal and the inverted third output signal and transmits the result to the first signal line, synthesizes the second output signal and the inverted first output signal and transmits the result to the second signal line, and synthesizes the third output signal and the inverted second output signal and transmits the result to the third signal line. The absolute value of the binary signal voltage of the first output signal and the absolute value of the binary signal voltage of the second output signal are identical, and the absolute value of the binary signal voltage of the third output signal and absolute value of the binary signal voltage of the first output signal are different.

The signal receiver of the multiple differential transmission system is connected to the differential transmission path, which has the first, second, and third signal lines, and includes a first differential receiver, a second differential receiver, a third differential receiver, a comparison unit, and a control unit.

The first differential receiver detects a polarity of a terminal voltage that is generated in a first terminal resistor that is connected between the first signal line and the second signal line, and outputs the result of that detection as a first bit information signal.

The second differential receiver detects a polarity of a terminal voltage that is generated in a second terminal resistor that is connected between the second signal line and the third signal line, and outputs the result of that detection as a second bit information signal.

The third differential receiver detects a polarity of a terminal voltage that is generated in a third terminal resistor that is connected between the third signal line and the first signal line, and outputs the result of that detection as a third bit information signal.

The comparison unit is for determining whether or not the absolute value of the third terminal voltage that is generated in the third terminal resistor exceeds a predetermined threshold voltage.

The control unit outputs the first, second, and third bit information signals that are output from the first, second, and third differential receivers, when the absolute value of the third terminal voltage exceeds the predetermined threshold voltage, and outputs a 0 or 1 for all of the first, second, and third bit information signals, depending on the third bit information signal that is output from the third differential receiver, when the absolute value of the third terminal voltage does not exceed the predetermined threshold voltage.

The threshold voltage is set so that it is larger than the absolute value of the difference between the absolute value of the binary signal voltage of the first output signal and the absolute value of the binary signal voltage of the third output signal.

The foregoing differential transmission line connector, characterized in that at least one of the first triangle and the second triangle is an equilateral triangle.

The foregoing differential transmission line connector, characterized in that both the first triangle and the second triangle are equilateral triangles.

The foregoing differential transmission line connector, characterized in that a length of edges of the first triangle is different from a length of edges of the second triangle.

The foregoing differential transmission line connector, further characterized in that the three signal lines of the first differential transmission line are formed in a plurality of conductor layers of a printed circuit board that is a multilayer board, and extend up to an end surface of the printed circuit board;

the differential transmission line connector is connected to the first differential transmission line at the end surface of the printed circuit board; and in at least one segment of the three signal lines of the differential transmission line connector, the three signal lines are positioned at the apexes of an equilateral triangle in an plane that substantially perpendicularly intersects the longitudinal direction of those three signal lines.

The foregoing differential transmission line connector, characterized in that the three signal lines of the first differential transmission line are formed in a plurality of conductor layers of a printed circuit board that is a multilayer board, and extend up to an end surface of the printed circuit board;

the differential transmission line connector is connected to the first differential transmission line at the end surface of the printed circuit board; and the three signal lines of the differential transmission line connector are positioned at the apexes of an equilateral triangle in an plane that substantially perpendicularly intersects the longitudinal direction of those three signal lines.

Further, the foregoing differential transmission line connector, characterized in that the three signal lines of the first differential transmission line are formed in a plurality of conductor layers of a printed circuit board that is a multilayer board;

the differential transmission line connector is connected to the first differential transmission line at the upper surface of the printed circuit board; and in at least one segment of the three signal lines of the differential transmission line connector, the three signal lines are positioned at the apexes of an equilateral triangle in an plane that substantially perpendicularly intersects the longitudinal direction of those three signal lines.

The foregoing differential transmission line connector, characterized in that the three signal lines of the differential transmission line connector are provided with a segment that is substantially perpendicular to the upper surface of the printed circuit board, and a segment that is substantially parallel to the longitudinal direction of the second differential transmission line.

According to the invention, it is possible to maintain a constant length of the signal lines when connecting different differential transmission lines each with three signal lines, and thus signal delays do not occur in the signal lines, and therefore it is possible to provide a differential transmission line connector with little unwanted radiation noise in which the electromagnetic fields of the signals that are transmitted cancel each other out.

BRIEF DESCRIPTION OF THE DRAWINGS

FIG. 16 is a diagram that shows the relationship between the bit information that is transferred, and the signal voltages Vs1, Vs2, and Vs3 of the signal lines 20$a$, 20$b$, and 20$c$ of the signal transmission route (differential transmission line) 20, in the multiple differential transmission system of FIG. 13.

FIG. 18 is a diagram that shows the relationship between the bit information that is transmitted, and the polarity of the terminal voltages V1, V2, and V3 of the terminal resistors 41, 42, and 43 of the signal receiver 7, in the multiple differential transmission system of FIG. 13.

FIG. 23 is a diagram that shows the relationship between the bit information that is transmitted, the signal voltages Vs1, Vs2, and Vs3 of the transmitted signals that are transmitted over the signal lines 20a, 20b, and 20c, and the terminal voltages V1, V2 and V3, and their polarities, of the terminal resistors 41, 42, and 43 of the signal receiver 7A, in the multiple differential transmission system of FIG. 20.

FIG. 27 is a diagram that shows the relationship between the bit information that is transmitted, the signal voltages Vs1, Vs2, and Vs3 of the transmitted signals that are transmitted over the signal lines 20a, 20b, and 20c, and the terminal voltages V1, V2, and V3, and their polarities, of the terminal resistors 41, 42, and 43 of the signal receiver 7B, in a third multiple differential transmission system that includes the differential transmission line according to the first embodiment of the invention (using the configuration of FIG. 20, differing only in the setting conditions).

DETAILED DESCRIPTION OF THE INVENTION

Embodiments of the invention are described below in reference to the drawings. It should be noted that in the various embodiments, identical structural components have been assigned the same reference numbers.

First Embodiment

<1.1: Differential Transmission System and Differential Transmission Line Connector>

Figure 1:
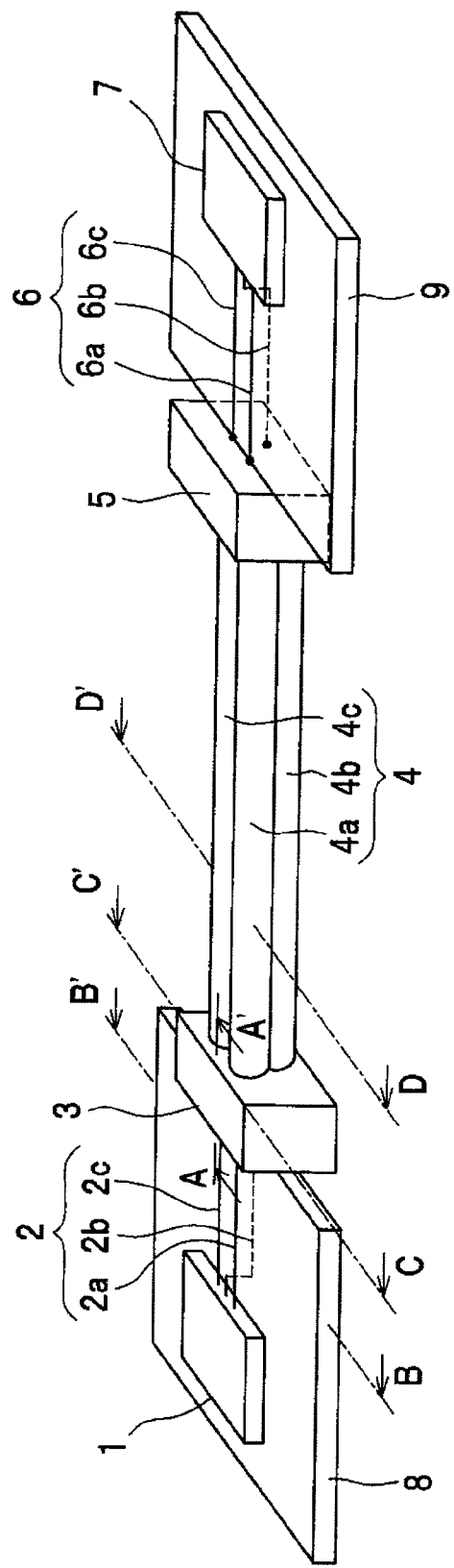
FIG. 1 is a perspective view that shows the configuration of a differential transmission system according to a first embodiment of the invention.
Figure 2:
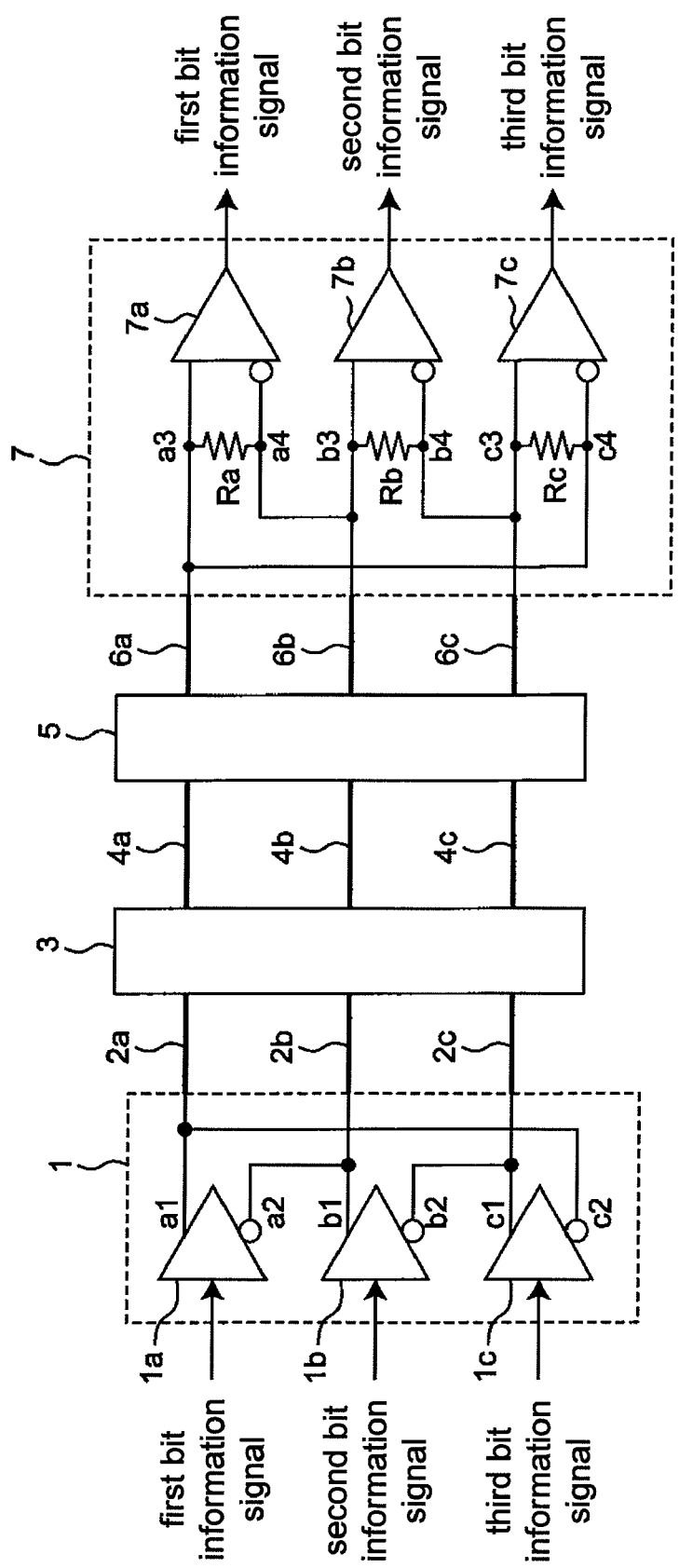
FIG. 2 is a circuit diagram of the differential transmission system of FIG. 1.

FIG. 1 is a perspective view showing the structure of a differential transmission system according to a first embodiment of the invention, and FIG. 2 is a circuit diagram of the differential transmission system of FIG. 1. With the differential transmission system of this embodiment, three bit information signals are differentially signaled simultaneously by LVDS (that is, multiple differential transmission is performed) via a differential transmission line that is made of three signal lines. In FIG. 1, the differential driver IC1, which is provided on a first printed circuit board 8, which is a double-sided board, and a differential receiver IC7, which is provided on a second printed circuit board 9, which is a double-sided board and which is different from the first printed circuit board 8, are connected to one another by a differential transmission line that is made from three signal lines. Here, the differential transmission line is made from a differential transmission pattern 2 of the printed circuit board 8, a differential transmission cable 4, and a differential transmission pattern 6 of the printed circuit board 9, the differential transmission pattern 2 is provided with three signal lines 2a, 2b, and 2c, the differential transmission cable 4 also is provided with three signal lines 4a, 4b, and 4c, and the differential transmission pattern 6 also is provided with three signal lines 6a, 6b, and 6c. The signal lines 2a, 2b, and 2c of the differential transmission pattern 2 and the signal lines 4a, 4b, and 4c of the differential transmission cable 4 are connected to one another via a connector (differential transmission line connector) 3 that is provided on the printed circuit board 8, and similarly, the signal lines 4a, 4b, and 4c of the differential transmission cable 4 and the signal lines 6a, 6b, and 6c of the differential transmission pattern 6 are connected to one another via a connector (differential transmission line connector) 5 that is provided on the printed circuit board 9.

First, the method of simultaneously differentially signaling the three bit information signals using a differential transmission line (that is, the line made of the differential transmission pattern 2, the differential transmission cable 4, and the differential transmission pattern 6) will be described in detail below. As shown in FIG. 2, in the differential transmission system of this embodiment the differential driver IC1 is constituted by differential driver circuits 1a, 1b, and 1c, and the differential receiver IC7 is constituted by differential receiver circuits 7a, 7b, 7c, which are differential amplifiers, and terminal resistors R1, Rb, and Rc.

In the differential driver IC 1, the positive output terminal a1 of the differential driver circuit 1a is connected to the signal line 2a and its negative output terminal a2 is connected to the signal line 2b, the positive output terminal b1 of the differential driver circuit 1b is connected to the signal line 2b and its negative output terminal b2 is connected to the signal line 2c, and the positive output terminal c1 of the differential driver circuit 1c is connected to the signal line 2c and its negative output terminal c2 is connected to the signal line 2a. The differential driver circuits 1a, 1b, and 1c each drive an approximately 3.5 mA current, and generate a differential signal in response to the bit information signal that arrives at the differential driver IC1. More specifically, the differential driver circuit 1a generates differential signals (that is, a signal with a predetermined amplitude, and its inverse signal) in response to a first bit information signal that arrives at the differential driver IC1 in order to produce a potential difference between the signal lines 2a and 2b. For example, when the bit information signal is 0, then the differential driver circuit 1a outputs a negative potential signal from the positive output terminal a1 and outputs a positive potential signal from the negative output terminal a2, whereas when the bit information signal is 1, the differential driver circuit 1a outputs a positive potential signal from the positive output terminal a1 and outputs a negative potential signal from the negative output terminal a2. Similarly, the differential driver circuit 1b generates differential signals in response to a second bit information signal that arrives at the differential driver IC1 in order to produce a potential difference between the signal lines 2b and 2c, and the differential driver circuit 1c generates differential signals in response to a third bit information signal that arrives at the differential driver IC1 in order to produce a potential difference between the signal lines 2c and 2a. The differential transmission line 2 has an odd mode impedance of 50 Ω, for example, between the signal lines 2a, 2b, and 2c. The signal lines 2a, 2b, and 2c have equal electrical properties and form equivalent transmission routes, and these three signal lines 2a, 2b, and 2c together effect the transmission of three bit information signals. The differential receiver IC3 is provided with a terminal resistor Ra that terminates the pair of signal lines 2a and 2b, a terminal resistor Rb that terminates the pair of signal lines 2b and 2c, and a terminal resistor Rc that terminates the pair of signal lines 2c and 2a. The terminal resistors Ra, Rb, and Rc each have a 100 Ω resistance value, which is equivalent to the differential impedance, and an approximately +350 mV or an approximately −350 mV voltage is generated at each end of the terminal resistors Ra, Rb, and Rc in accordance with the direction of the approximately 3.5 mA current that is driven by the differential driver circuits 1a, 1b, and 1c. The differential receiver circuit 3a detects the positive or negative potential that occurs between the ends of the resistor Ra, and decodes the first bit information signal that was transmitted and converts the decoded first bit information signal to the CMOS level and outputs it. Similarly, the differential receiver circuit 3b detects the positive or negative potential that occurs between the ends of the resistor Rb, and decodes the second bit information signal that was transmitted and converts the decoded second bit information signal to the CMOS level and outputs it, and the differential receiver circuit 3c detects the positive or negative potential that occurs between the ends of the resistor Rc, and decodes the third bit information signal that was transmitted and converts the decoded third bit information signal to the CMOS level and outputs it.

When a bit information signal is transmitted over the differential transmission line 2, the differential receiver IC3 decodes the bit information signal prior to transmission as shown below.

Table 1 is a bit assignment table that shows the relationship between the bit information signals that are transmitted, and the potential (terminal potential) at the terminals on the side of the differential receiver circuits 3a, 3b, and 3c of the signal lines 2a, 2b, and 2c. The values of the terminal potentials have been normalized in order to simplify the description.

TABLE 1

| first bit information | second bit information | third bit information | terminal potential of signal line 2a | terminal potential of signal line 2b | terminal potential of signal line 2c |
|---|---|---|---|---|---|
| 0 | 0 | 0 | 0 | 0 | 0 |
| 0 | 0 | 1 | −1 | 0 | 1 |
| 0 | 1 | 0 | 0 | 1 | −1 |
| 0 | 1 | 1 | −1 | 1 | 0 |
| 1 | 0 | 0 | 1 | −1 | 0 |
| 1 | 0 | 1 | 0 | −1 | 1 |
| 1 | 1 | 0 | 1 | 0 | −1 |
| 1 | 1 | 1 | 0 | 0 | 0 |

Here, the terminal potentials of the signal lines 2a, 2b, and 2c are described. In one signal line, on its driver side, two voltage signals V1 and V2 that are generated by two differential driver circuits are superimposed and applied, and on its receiver side, the overall impedance Z of the receiver is charged. When r is the internal resistance of the signal line, the terminal potential V of the signal line is expressed by the following equation.

$$V = \frac{V_1 + V_2}{r + 2Z} Z \tag{1}$$

Here, r can be regarded as significantly smaller than Z, and thus the equation can be approximated as follows.

$$V = \frac{1}{2}(V_1 + V_2) \tag{2}$$

Table 2 shows the current direction at the terminal resistors Ra, Rb, and Rc.

TABLE 2

| first bit information | second bit information | third bit information | current direction at terminal resistor Ra | current direction at terminal resistor Rb | current direction at terminal resistor Rc |
|---|---|---|---|---|---|
| 0 | 0 | 1 | − | − | + |
| 0 | 1 | 0 | − | + | − |
| 0 | 1 | 1 | − | + | + |
| 1 | 0 | 0 | + | − | − |
| 1 | 0 | 1 | + | − | + |
| 1 | 1 | 0 | + | + | − |

In this way, the voltage that is applied to the signal lines 2a, 2b, and 2c of the differential transmission line 2 totals 0 regardless of the bit information signal that is transmitted, and noise that radiates from the signal lines 2a, 2b, and 2c cancels itself out, and thus transmission with little noise is possible.

<1.2: Multiple Differential Transmission System Including Differential Transmission Lines>

More specifically, here is described a multiple differential transmission system that includes the differential transmission line according to this embodiment of the invention.

<1.2.1 : First Multiple Differential Transmission System>

Figure 13:
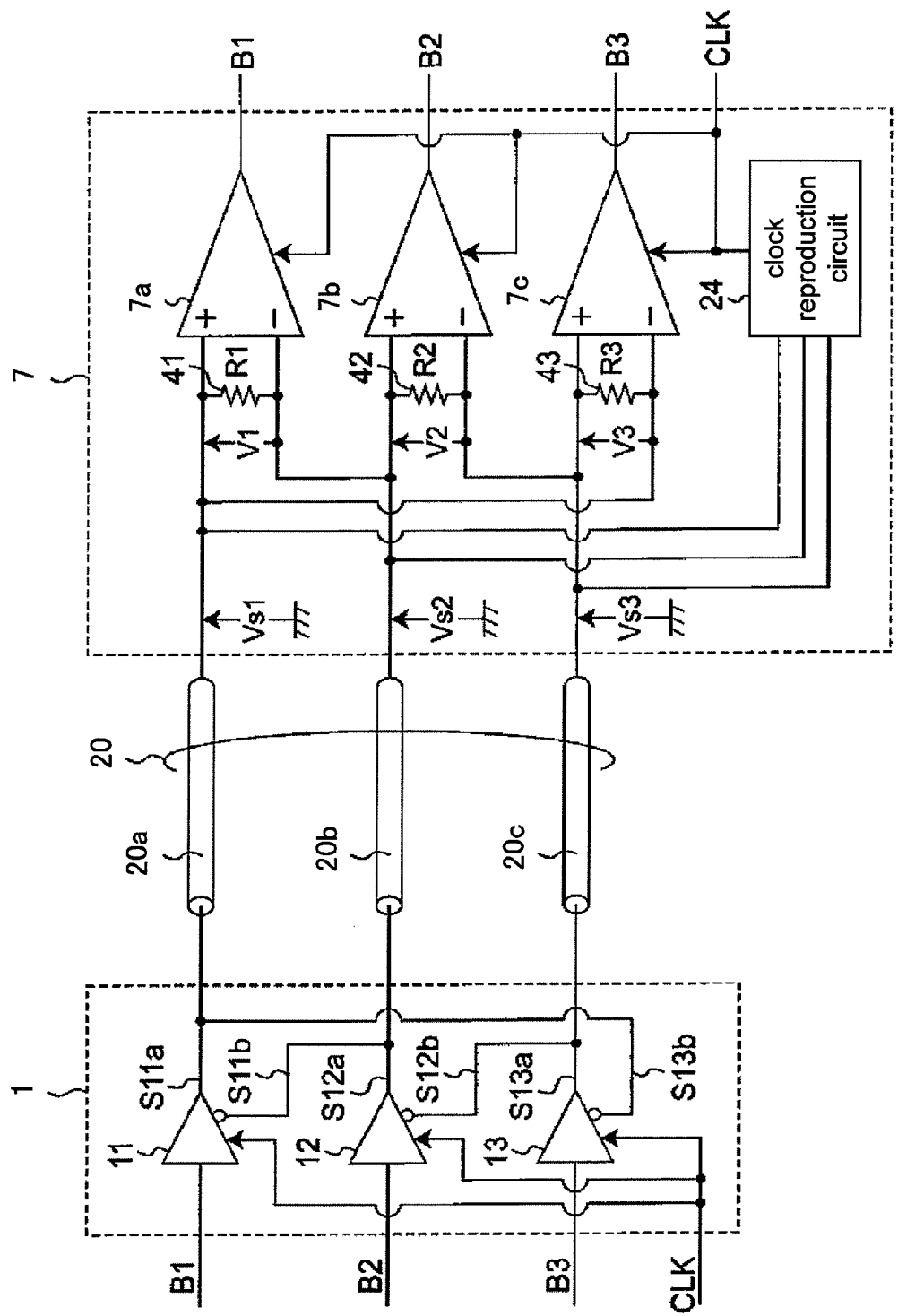
FIG. 13 is a block diagram that shows the configuration of a first differential transmission system that includes the differential transmission line according to the first embodiment of the invention.

FIG. 13 is a block diagram that shows the configuration of a first multiple differential transmission system that includes the differential transmission line according to this embodiment of the invention. In FIG. 13, the first multiple differential transmission system is made by connecting a signal transmitter (differential driver IC) 1 and a signal receiver (differential receiver IC) 7 via a signal transmission route (differential transmission line) 20. The signal transmitter 1 is provided with (a) a differential driver 1a that outputs a first output signal S11a and an inverted first output signal S11b, whose phase is inverted compared to the first output signal 11a, in response to a bit information signal B1, which is either high or low level, (b) a differential driver 1b that outputs a second output signal S12a and an inverted second output signal S12b, whose phase is inverted compared to the second output signal 12a, in response to a bit information signal B2, which is either high or low level, and (c) a differential driver 1c that outputs a third output signal S13a and an inverted third output signal S13b, whose phase is inverted compared to the third output signal 13a, in response to a bit information signal B3, which is either high or low level. The binary voltage level of each output signal is ±1 V and these are equal to one another, and the differential drivers 1a, 1b, and 1c operate so as to send the output signals in synchronization with the rise in the clock CLK.

It should be noted that for the sake of ease of description, in FIG. 13, the signal line 2a, the connector 3, the signal line 4a, the connector 5, and the signal line 6a in FIG. 2 are collectively depicted by 20a, the signal line 2b, the connector 3, the signal line 4b, the connector 5, and the signal line 6b in FIG. 2 are collectively depicted by 20b, and the signal line 2c, the connector 3, the signal line 4c, the connector 5, and the signal line 6c in FIG. 2 are collectively depicted by 20c. Additionally, 20a, 20b, and 20c are together described below as a signal transmission route 20.

The signal transmission route (differential transmission line) 20 is made of signal lines 20a, 20b, and 20c. Here, the first output signal S11a from the differential driver 1a and the inverted third output signal S13b from the differential driver 1c are synthesized and then delivered to the signal line 20a. The second output signal S12a from the differential driver 1b and the inverted first output signal 511b from the differential driver 1a are synthesized and then delivered to the signal line 20b. The third output signal S13a from the differential driver 1c and the inverted second output signal S12b from the differential driver 1b are synthesized and then delivered to the signal line 20c.

The signal receiver 7 is made of three individual differential receivers 7a, 7b, and 7c, each of which are bit information decision devices (as described later using FIG. 19, they are made from comparators that determine whether or not the terminal voltages V1, V2, and V3 are negative), a clock reproduction circuit 24, and three terminal resistors 41, 42, and 43. The terminal resistor 41 is connected between the signal line 20a and the signal line 20b, and the direction of the current that flows to the terminal resistor 41 or the polarity of the terminal voltage V1 that is generated in the terminal resistor 41 is detected by the differential receiver 7a. The terminal resistor 42 is connected between the signal line 20b and the signal line 20c, and the direction of the current that flows to the terminal resistor 42 or the polarity of the terminal voltage V2 that is generated in the terminal resistor 42 is detected by the differential receiver 7b. The terminal resistor 43 is connected between the signal line 20c and the signal line 20a, and the direction of the current that flows to the terminal resistor 43 or the polarity of the terminal voltage V3 that is generated in the terminal resistor 43 is detected by the differential receiver 7c. The clock reproduction circuit 24 includes a rise detection circuit and a PLL circuit, and produces a clock CLK that has a predetermined period in response to detection of the rising edge of the transmitted signal that is transmitted to the three signal lines 20a, 20b, and 20c, and outputs the clock CLK to the differential receivers 7a, 7b, and 7c. The differential receivers 7a, 7b, and 7c execute a decision regarding the bit information, as described later, in synchronization with the rise in the clock CLK that is input, and output bit information signals B1, B2, and B3, respectively.

Figure 14:
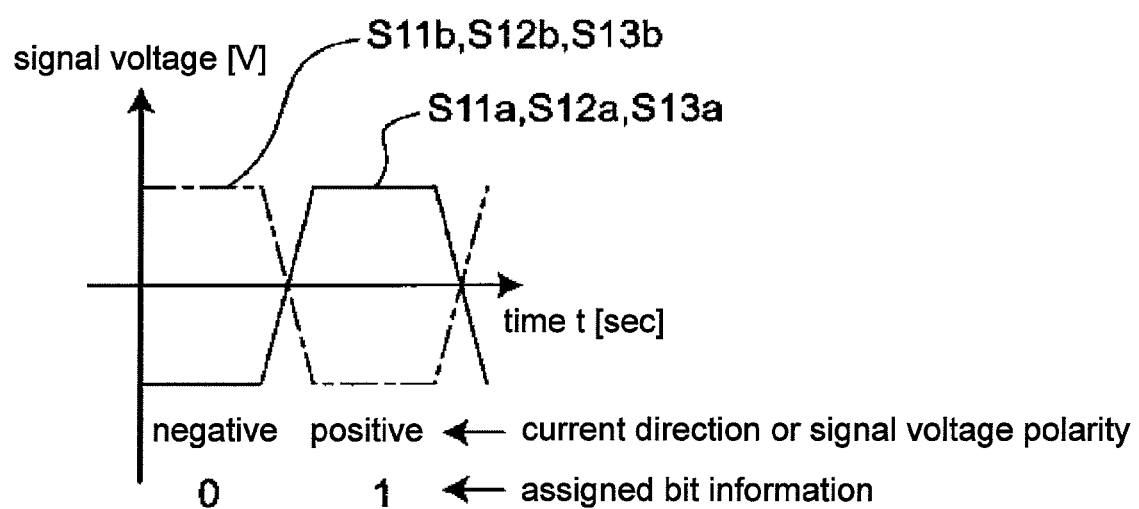
FIG. 14 is a waveform diagram that shows the relationship between the signal waveforms of the output signals S11$a$, S11$b$, S12$a$, S12$b$, S13$a$, and S13$b$ of the differential drivers 1$a$, 1$b$, and 1$c$ of FIG. 13, the definition of the current direction or the signal voltage polarity, and the bit information that is assigned.
Figure 15:
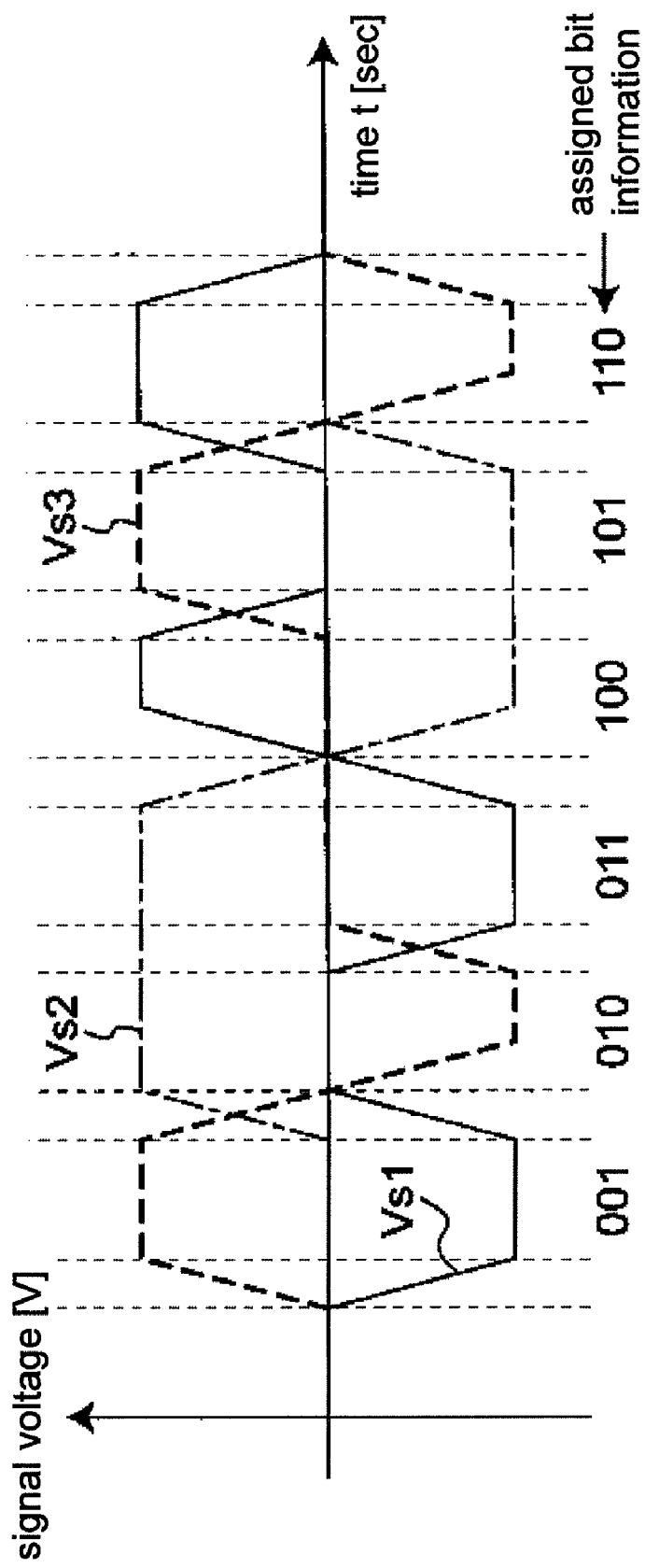
FIG. 15 is a waveform diagram that shows the relationship between the signal waveforms of the signal voltages Vs1, Vs2, and Vs3 of the transmitted signals that are transmitted via the signal lines 20$a$, 20$b$, and 20$c$ of the signal transmission route (differential transmission line) 20 of FIG. 13, and the bit information that is assigned.

FIG. 14 is a waveform diagram that shows the relationship between the signal waveforms of the output signals S11a, S11b, S12a, S12b, S13a, and S13b of the differential drivers 1a, 1b, and 1c of FIG. 13, a definition of the current direction or the polarity of the signal voltage, and the assigned bit information, and FIG. 15 is a waveform diagram that shows the relationship between the signal waveforms of the signal voltages Vs1, Vs2, and Vs3 of the transmitted signals that are transmitted via the signal lines 20a, 20b, and 20c of the signal transmission route (differential transmission line) 20 of FIG. 13, and the bit information that is assigned. The differential receivers 7a, 7b, and 7c output the output signals shown in FIG. 14 in accordance with the bit information signals that are input, and, at this time, the signal voltages Vs1, Vs2, and Vs3 of the transmitted signals that are transmitted via the signal lines 20a, 20b, and 20c of the signal transmission route (differential transmission line) 2 in accordance with the three-bit bit information signals that are input are shown in FIG. 15.

Figure 17:
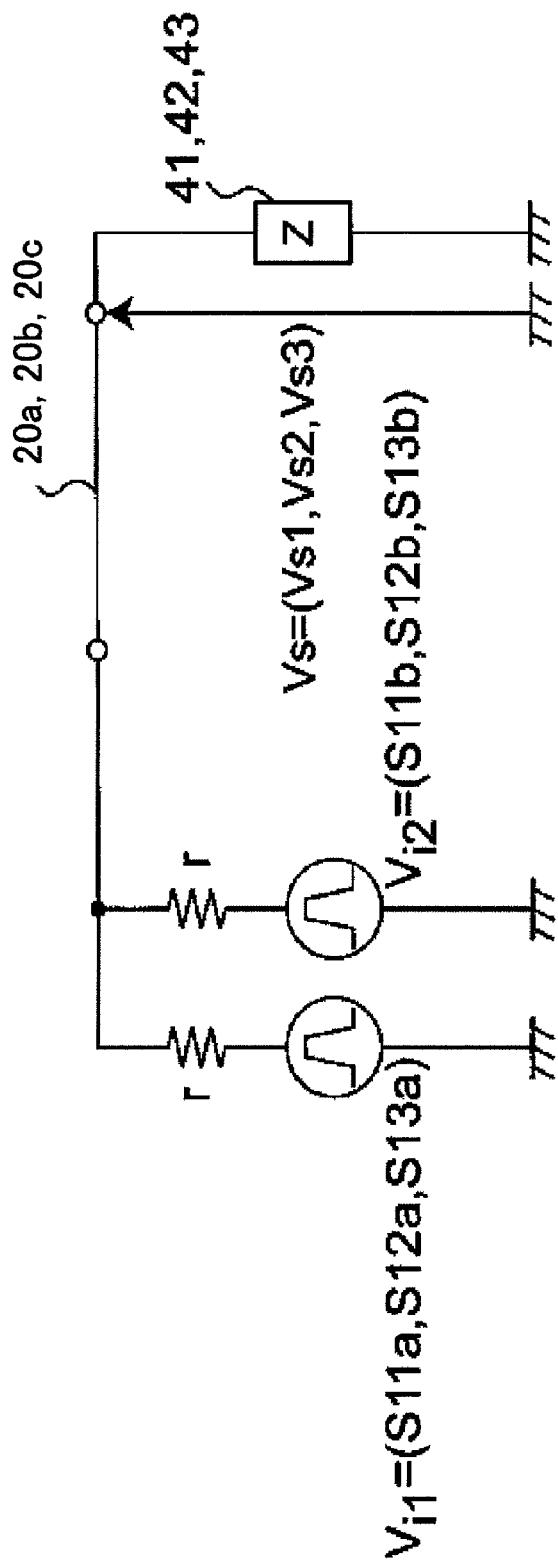
FIG. 17 is a circuit diagram that shows an equivalent network of the signal transmitter 1 and the signal lines 20$a$, 20$b$, and 20$c$, for describing the signal voltages Vs1, Vs2, and Vs3 of the signal lines 20$a$, 20$b$, and 20$c$ of FIG. 13.

FIG. 16 is a diagram that shows the relationship between the bit information that is transferred, and the signal voltages Vs1, Vs2, and Vs3 of the transmitted signals that are transmitted by the signal lines 20a, 20b, and 20c of the signal transmission route (differential transmission line) 20, in the multiple differential transmission system of FIG. 13, and FIG. 17 is a circuit diagram that shows an equivalent network of the signal transmitter 1 and the signal lines 20a, 20b, and 20c, for describing the signal voltages Vs1, Vs2, and Vs3 of the signal lines 20a, 20b, and 20c of FIG. 13. The signal voltages Vs1, Vs2, and Vs3 of the signal lines 20a, 20b, and 20c are described here in reference to FIG. 16 and FIG. 17.

The signal voltages V11 and V12 from two differential drivers (1a,1b; 1b,1c; 1c,1a) are superimposed in the signal lines 20a, 20b, and 20c. With r as the internal resistance of the differential drivers 1a, 1b, and 1c, and Z as the impedance of the terminal resistors 41, 42, and 43 of the signal receiver 7 (the input impedance of the differential receivers 7a, 7b, and 7c is infinite (ideal value)), the signal voltage Vs that is generated in the signal lines 20a, 20b, and 20c is represented by the following equation.

Eq. 3

$$Vs = \frac{V_{i1} + V_{i2}}{r + 2Z} Z \qquad (3)$$

Here, r can be regarded as significantly smaller than Z, and thus the equation can be approximated as follows.

Eq. 4

$$V_S = \frac{1}{2}(V_{i1} + V_{i2}) \quad (4)$$

FIG. 18 is a diagram that shows the relationship between the bit information that is transmitted, and the polarity of the terminal voltages V1, V2, and V3 of the terminal resistors 41, 42, and 43 of the signal receiver 7, in the multiple differential transmission system of FIG. 13.

From FIG. 18 it can be understood that by determining the current direction or the polarity of the terminal voltage from the potential difference that occurs between a pair of adjacent signal lines when superimposed on the three signal lines 20a, 20b, and 20c (the terminal voltages of the terminal resistors 41, 42, and 43), it is possible to decode the bit information signal that has been output by the differential drivers 1a, 1b, and 1c in six states other than when all bits are 0 or 1. Further, the signal voltage that is applied to the signal lines 20a, 20b, and 20c of the signal transmission route (differential transmission line) 20 totals 0 in all cases where the bit information signal is transmitted, and the noise that radiates from the signal lines 20a, 20b, and 20c cancels itself out, and thus, like with the normal signal transmission method, it is possible to achieve transmission in which there is little noise.

Figure 19:
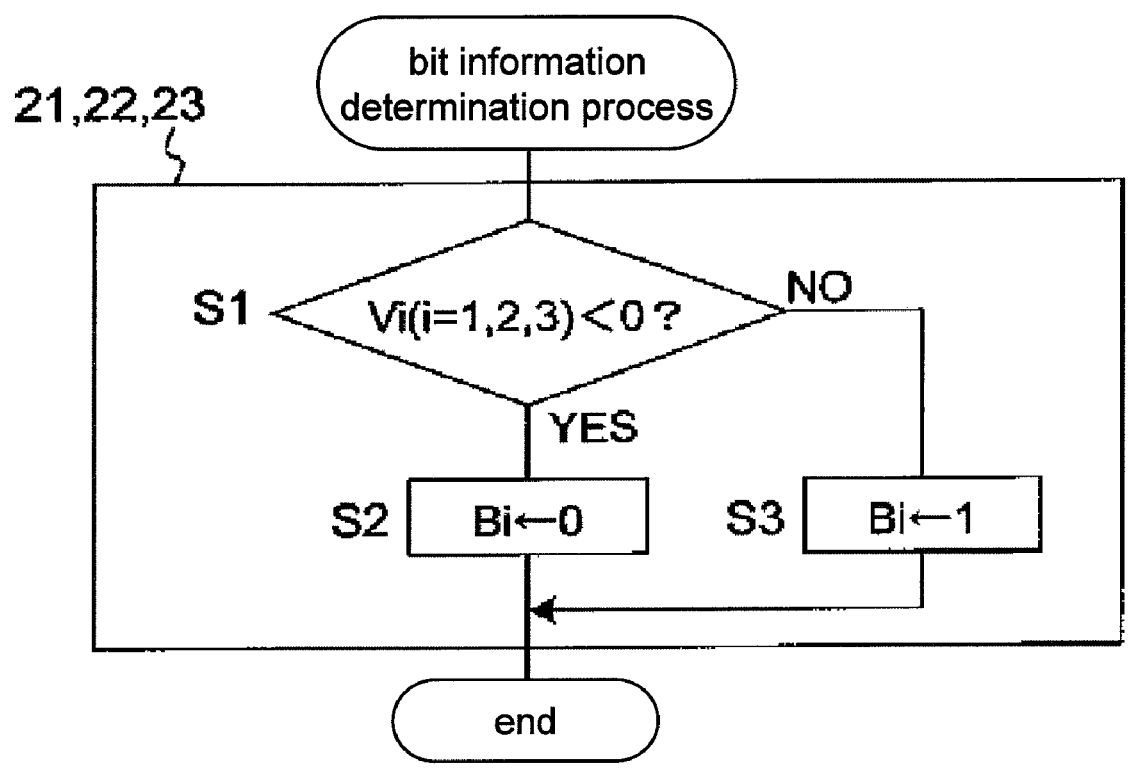
FIG. 19 is a flowchart that illustrates the bit information determination process that is executed by the differential receivers 7$a$, 7$b$, and 7$c$ of the signal receiver 7 of FIG. 13.

FIG. 19 is a flowchart that illustrates the bit information decision process that is executed by the differential receivers 7a, 7b, and 7c of the signal receiver 7 of FIG. 13.

In FIG. 19, first in step S1 the differential receivers 7a, 7b, and 7c determine whether the current flowing to the terminals 41, 42, and 43 is negative, or whether the terminal voltage Vi (i=1,2,3) of the terminal resistors 41, 42, and 43 is negative. When the result is YES, the procedure advances to step S2 and a 0 is set for the bit information Bi, and when the result is NO, then the procedure advances to step S3 and a 1 is set for the bit information Bi. The bit information decision process is then ended.

(1.2.2: Second Multiple Differential Transmission System)

Figure 20:
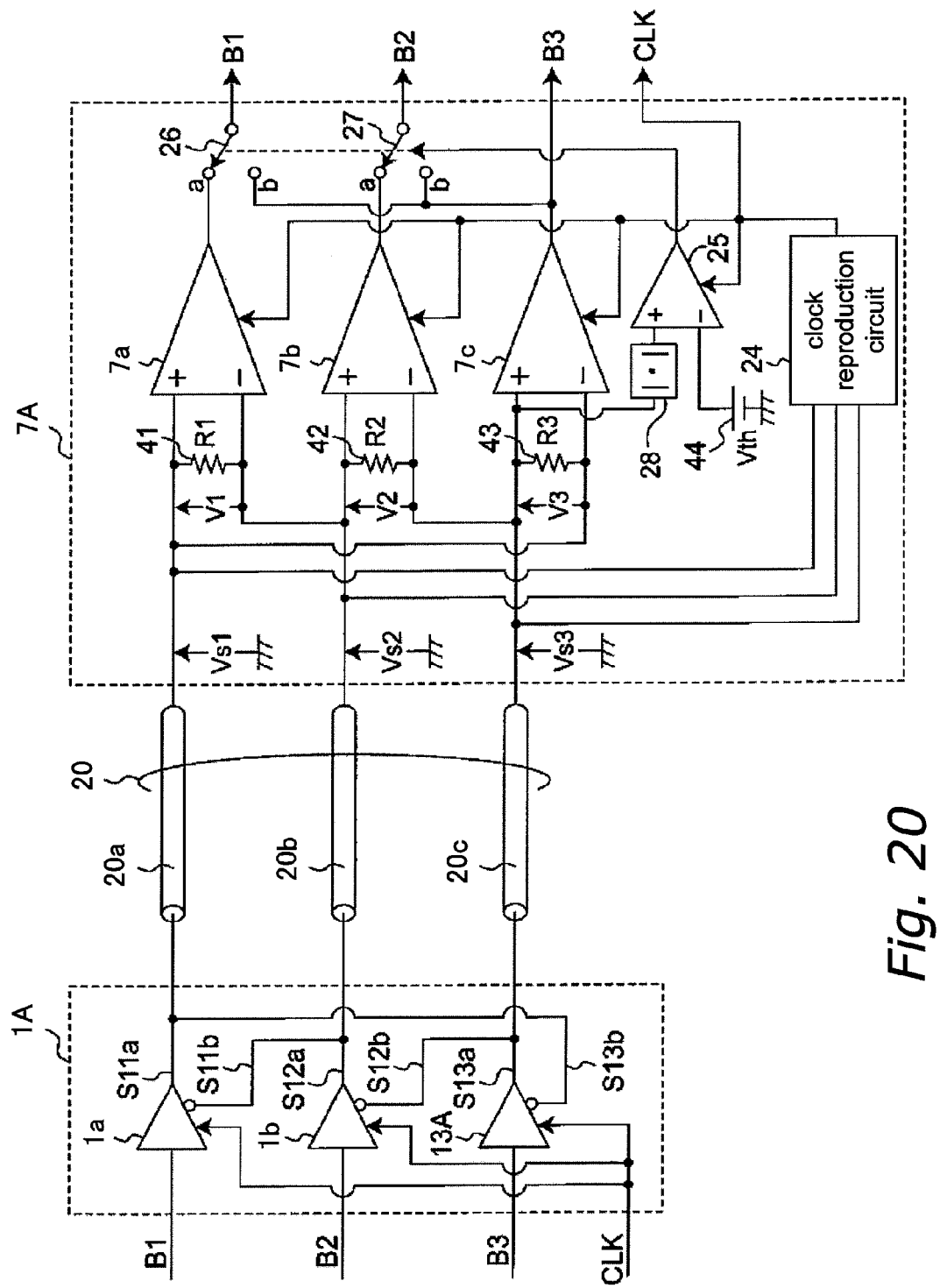
FIG. 20 is a block diagram that shows the configuration of a second multiple differential transmission system that includes the differential transmission line according to the first embodiment of the invention.

FIG. 20 is a block diagram that shows the configuration of a second multiple differential transmission system that includes the differential transmission line according to this embodiment of the invention. In FIG. 20, the second multiple differential transmission system is made by connecting a signal transmitter (differential driver IC) 1A and a signal receiver (differential receiver IC) 7A via a signal transmission route (differential transmission line) 20. Like in the first multiple differential transmission system, the signal transmitter 1A is provided with three differential drivers 1a, 1b, and 13A, the method of connecting the differential drivers 1a, 1b, and 13A with the signal lines 20a, 20b, and 20c is the same as in the first multiple differential transmission system, and the binary voltage levels of the output signals of the differential driver la and the differential driver 1b are equal to ±1 V, whereas the binary voltage level of the output signal of the differential driver 13A is equal to ±1.5 V, and its absolute value is set higher than the differential drivers 1a and 1b.

The signal receiver 3A is characterized over the signal receiver 7 of the first multiple differential transmission system in that it further includes a comparator 25 that has a threshold voltage source 44, switches 26 and 27 that are operated to switch by an output signal from the comparator 25, and an absolute value calculator 28. In the second multiple differential transmission system, the absolute value calculator 28 detects the terminal voltage V3 of the terminal resistor 43 and then calculates its absolute value |V3| and outputs a voltage signal that indicates this to the non-inverted input terminal of the comparator 25. The comparator 25 compares the absolute value |V3| of the terminal voltage V3 with the threshold voltage Vth from the threshold voltage source 44, and when |V3|>|Vth|, it outputs a high level control signal to the switches 26 and 27 to cause the switches 26 and 27 to switch to a contact a, whereas when |V3|≦|Vth|, it outputs a low level control signal to the switches 26 and 27 to cause the switches 26 and 27 to switch to a contact b. The differential receivers 7a, 7b, and 7c execute the bit information determination as discussed above in synchronization with the clock CLK that is input, and output bit information signals B1, B2, and B3, respectively. Here, when the switches 26 and 27 have been switched to the contact a (the processing of steps S21 to S23 is executed when YES in step S11 in FIG. 24), the bit information signal B1 is output from the differential receiver 7a via the contact a of the switch 26, the bit information signal B2 is output from the differential receiver 7b via the contact a of the switch 27, and the bit information signal B3 is output from the differential receiver 7c as it is. On the other hand, when the switches 26 and 27 have been switched to the contact b (the processing of steps S12 to S14 is executed when NO in step S11 in FIG. 24), a bit information signal whose determination result (000 or 111) of the bit information signal B3 from the differential receiver 7c is output as the bit information signals B1, B2, and B3.

When Vd1, Vd2, and Vd3 are the absolute values of the binary signal voltages of the output signals of the differential drivers 1a, 1b, and 13A, then with the settings of the second multiple differential transmission system (Vd3>Vd1 (for example, when Vd1=Vd2=1.0 V; Vd3=1.5 V), a method of distinguishing the bit information signals 000 and 111 from all other bit information signals can be executed under the following conditions.

(1) |Vd1|=|Vd2|
(2) |Vd3|≠|Vd1|: Because when Vd3=Vd1, and bit information signals 000 and 111 are transmitted, the potential difference between the signal lines becomes 0, making the determination impossible.
(3) |Vd3|≠|3Vd1|: Because when Vd3=3Vd1, and bit information signals 010 to 101 are transmitted, the potential difference of 0 occurs between the signal lines, making the determination impossible.
(4) |Vd3|>|Vd1|/2: Because the threshold value |Vth| becomes 0 or lower, making the determination impossible.
(5) |Vd1−Vd3|<|Vth|: This is the threshold value condition. Thus, determination is possible only with the comparator 25 and the absolute value calculator 28.

In the first setting example, the threshold value Vth is set to 0.5 V<Vth<1.0 V, and for example Vth=0.8 V.

Figure 21:
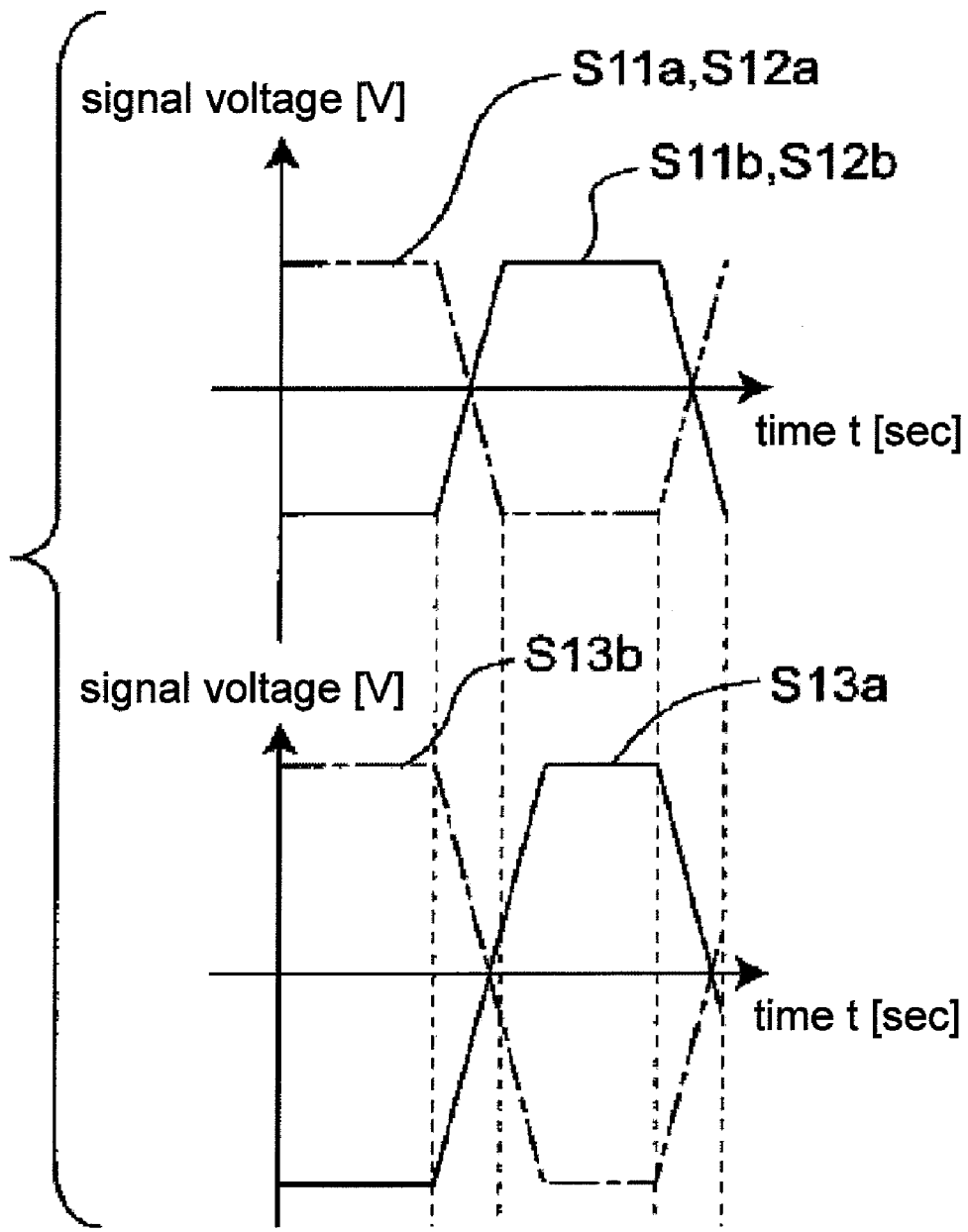
FIG. 21 is a signal waveform diagram that shows the signal waveforms of the output signals S11a, S11b, S12a, S12b, S13a, and S13b of the differential drivers 1a, 1b, and 13A of FIG. 20.
Figure 22:
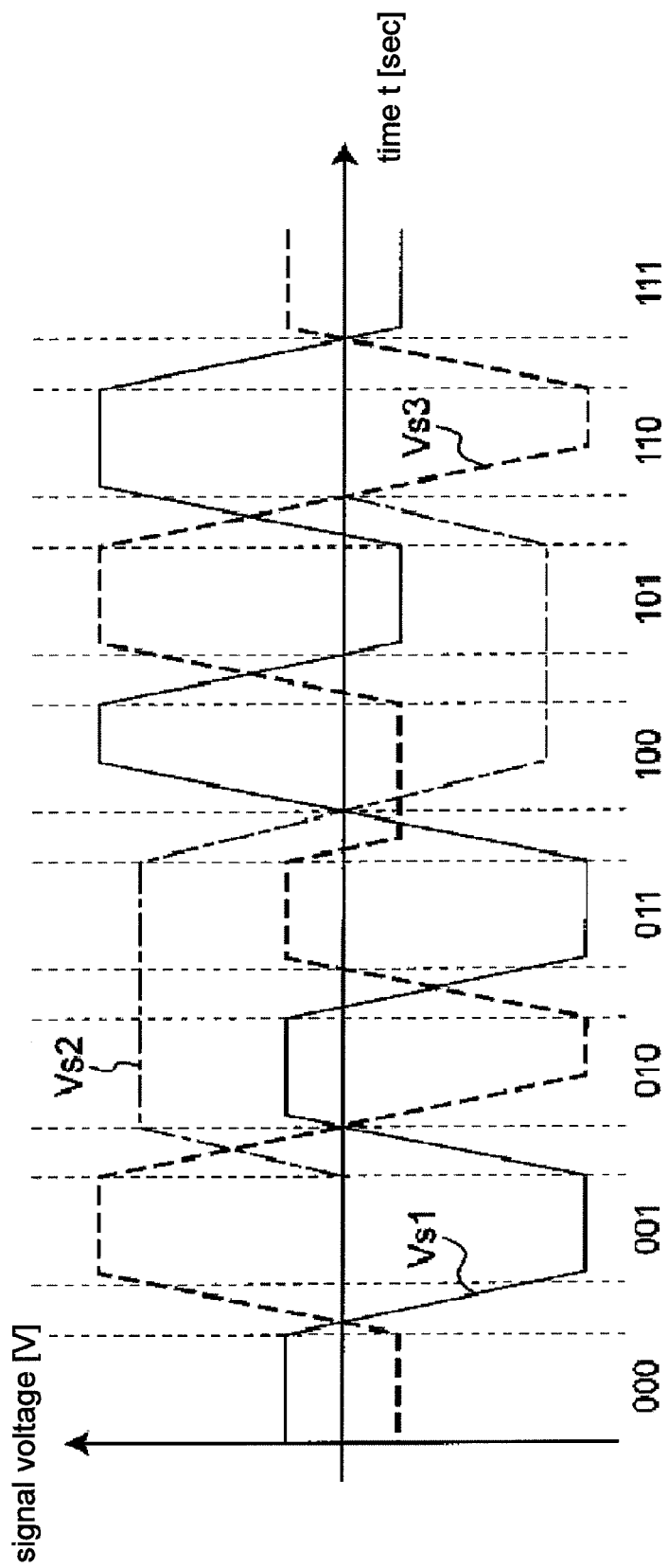
FIG. 22 is a waveform diagram that shows the relationship between the signal waveforms of the signal voltages Vs1, Vs2, and Vs3 of the transmitted signals that are transmitted via the signal lines 20a, 20b, and 20c of the signal transmission route (differential transmission line) 20 in FIG. 20, and the bit information that is assigned.

FIG. 21 is a signal waveform diagram that shows the signal waveforms of the output signals S11a, S11b, S12a, S12b, S13a, and S13b of the differential drivers 1a, 1b, and 13A of FIG. 20. FIG. 22 is a waveform diagram that shows the relationship between the signal waveforms of the signal voltages Vs1, Vs2, and Vs3 of the transmitted signals that are transmitted via the signal lines 20a, 20b, and 20c of the signal transmission route (differential transmission line) 20 in FIG. 20, and the bit information that is assigned. Further, FIG. 23 is a diagram that shows the relationship between the bit information that is transmitted, the signal voltages Vs1, Vs2, and Vs3 of the transmitted signals that are transmitted over the signal lines 20a, 20b, and 20c, and the terminal voltages V1, V2 and V3, and their polarities, of the terminal resistors 41, 42, and 43 of the signal receiver 3A, in the multiple differential transmission system of FIG. 20.

As described above, by setting only the signal voltage level of only the one differential driver 13A to a different value than the signal voltage levels of the other differential drivers 1a and 1b, and providing the circuit elements 25 through 28, which form a total bit compensation circuit, it is possible to decode the bit information signal in all eight states, including instances where all bits are 0 or 1. The signal voltage that is applied to the signal lines 20a, 20b, and 20c of the signal transmission route (differential transmission line) 20 totals 0 regardless of the bit information that is transmitted, such that the noise that radiates from the signal lines 20a, 20b, and 20c cancels itself out, and thus, like in ordinary differential transmission, it is possible to achieve transmission in which there is little noise.

Figure 24:
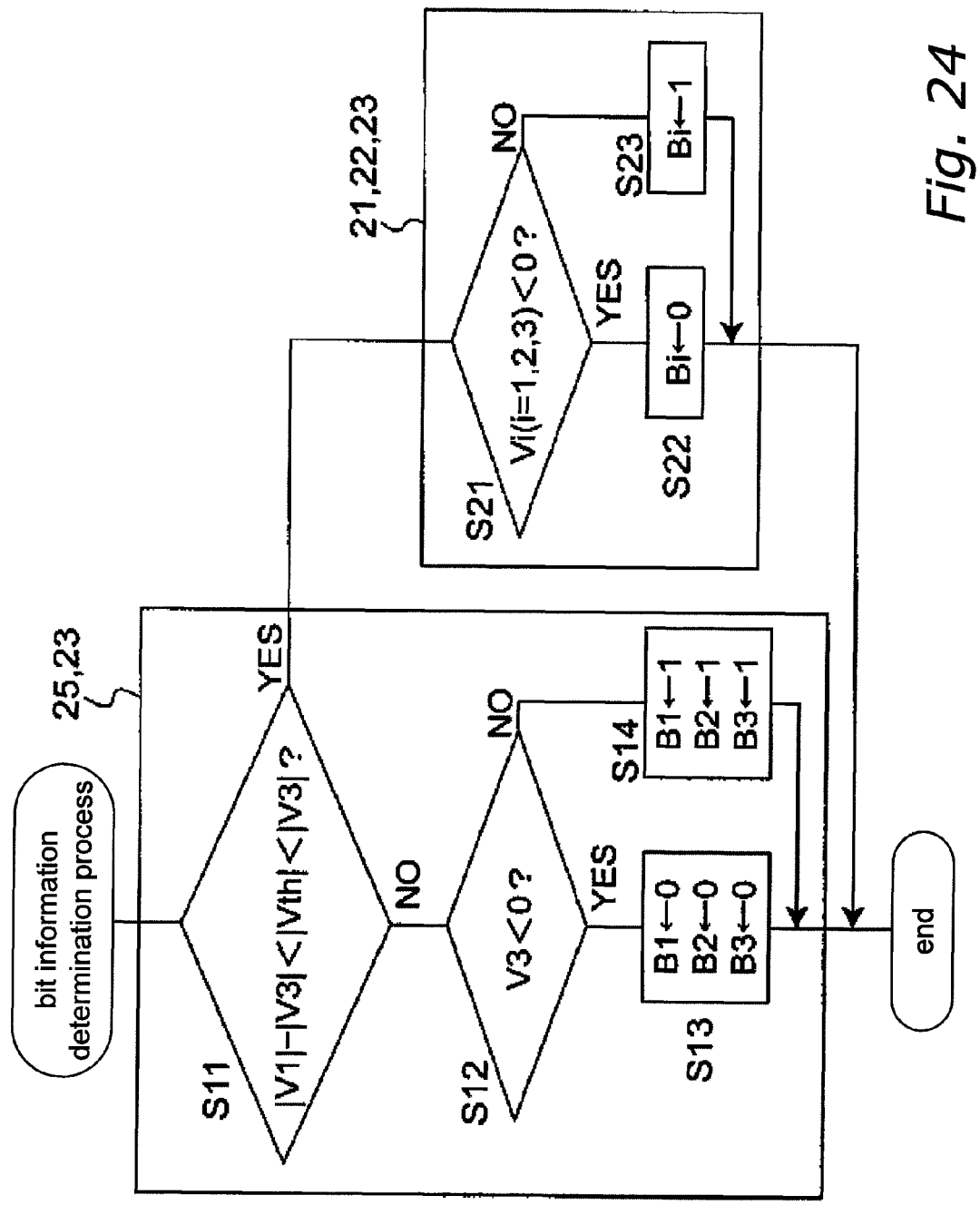
FIG. 24 is a flowchart that shows a first working example of the bit information determination process that is executed by the differential receivers 7a, 7b, and 7c of the signal receiver 7A and the comparator 25 in the multiple differential transmission system of FIG. 20.

FIG. 24 is a flowchart that shows a first working example of the bit information determination process that is executed by the differential receivers 7a, 7b, and 7c of the signal receiver 7A and the comparator 25 in the multiple differential transmission system of FIG. 20.

In FIG. 24, first in step S11 the comparator 25 determines whether or not the absolute value |V3| of the terminal voltage V3 of the terminal resistor 43 exceeds the threshold value Vth. It should be noted that in this multiple transmission system, |V1−V3|<|Vth| has been set in advance in accordance with the above threshold value conditions (|Vd1−Vd3|<|Vth|). When step S11 is NO the procedure advances to step S12, and when YES the procedure advances to step S21, and the differential receivers 7a, 7b, and 7c determine whether or not the terminal voltage Vi (i=1,2,3) of the terminal resistors 41, 42, and 43 is negative polarity, and when YES the procedure advances to step S22 and 0 is set as the bit information signal Bi, whereas when NO the procedure is advanced to step S23 and 1 is set as the bit information Bi. The bit information determination processing is then ended. In step S12 it is determined whether the terminal voltage V3 of the terminal resistor 43 is negative, and if YES, the procedure advances to step S13 and all bit information signals B1, B2, and B3 are set to 0, whereas if NO, the procedure advances to step S14 and all bit information signals B1, B2, and B3 are set to 1. The bit information determination process is then ended.

MODIFIED EXAMPLE

Figure 25:
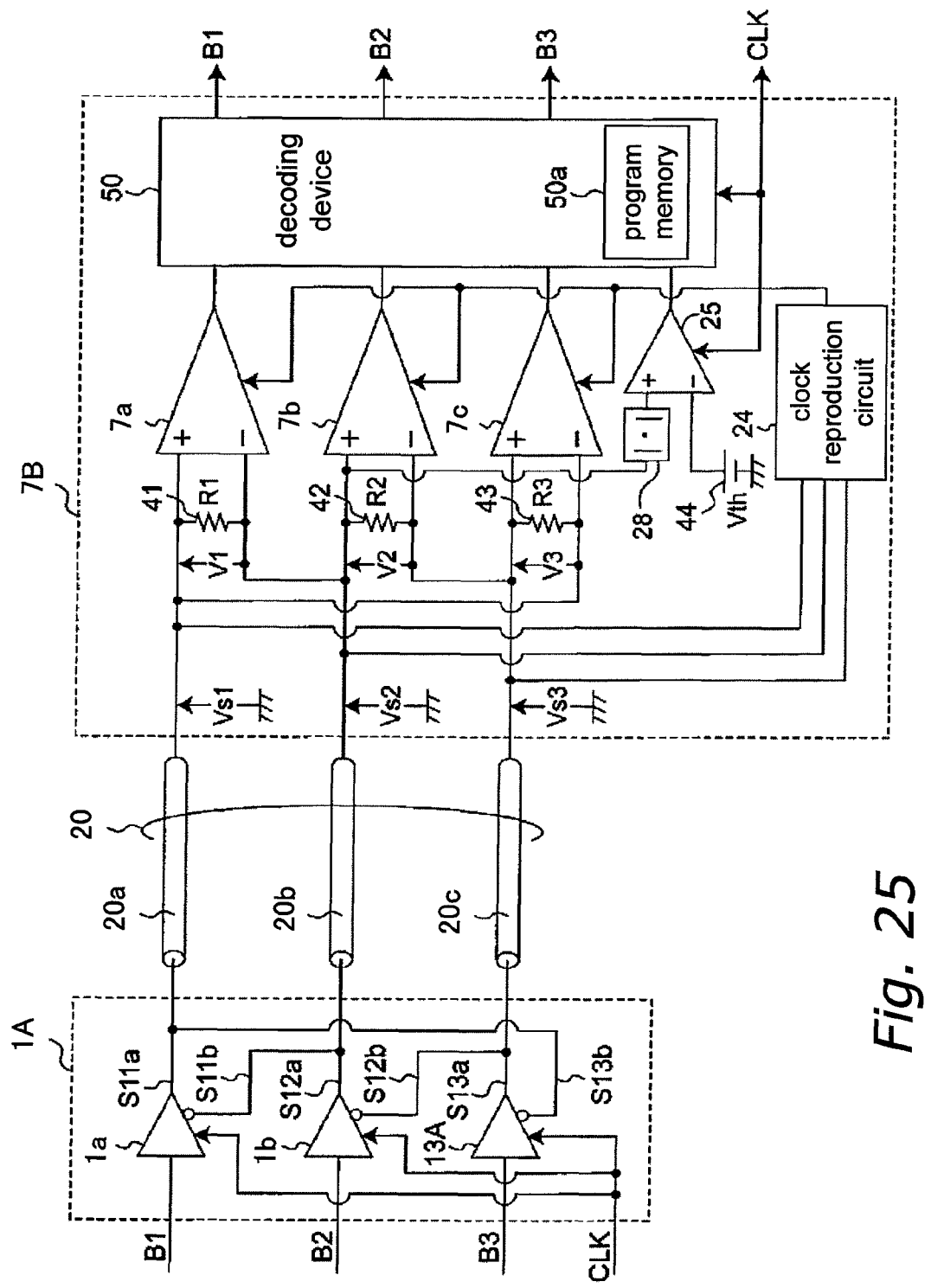
FIG. 25 is a block diagram that shows the configuration of a multiple differential transmission system according to a modified example of the second multiple differential transmission system.

FIG. 25 is a block diagram that shows the configuration of a multiple differential transmission system according to a modified example of the second multiple differential transmission system. The multiple differential transmission system of this modified example is characterized in that, compared to the second multiple differential transmission system of FIG. 20, it is provided with a signal receiver 7B instead of the signal receiver 7A, and the signal receiver 7B is provided with a decoding device 50 that has a program memory 50a and that executes the bit information determination process of FIG. 26 (which is pre-stored in the program memory 50a) instead of the switches 26 and 27, as shown in FIG. 25. It should be noted that the absolute value calculator 28 detects the terminal voltage V2 of the terminal resistor 42 and calculates the absolute value |V2|=|V1+V3| and outputs a signal that indicates the result of this calculation to the non-inverted input terminal of the comparator 25.

In the multiple differential transmission system according to this modified example, a method of distinguishing the bit information signals 000 and 110, and 111 and 000, can be executed under the following conditions.

(1) |Vd1|=|Vd2|
(2) |Vd3|≠|Vd1|: Because when Vd3=Vd1, and the bit information signals 000 and 111 are transmitted, the potential difference between the signal lines becomes 0, making the determination impossible.
(3) |3Vd3|≠|Vd1|: Because when Vd3=3Vd1, and bit information signals 010 to 101 are transmitted, a potential difference of 0 occurs between the signal lines, making the determination impossible.
(4) |Vd1−Vd3|<|Vth|: This is the threshold value condition. Thus, determination is possible only with the comparator 25 and the absolute value calculator 28. It should be noted that in FIG. 25, the absolute value calculator 28 computes the absolute value |V2| of the terminal voltage V2 and outputs this to the comparator 25.

Figure 26:
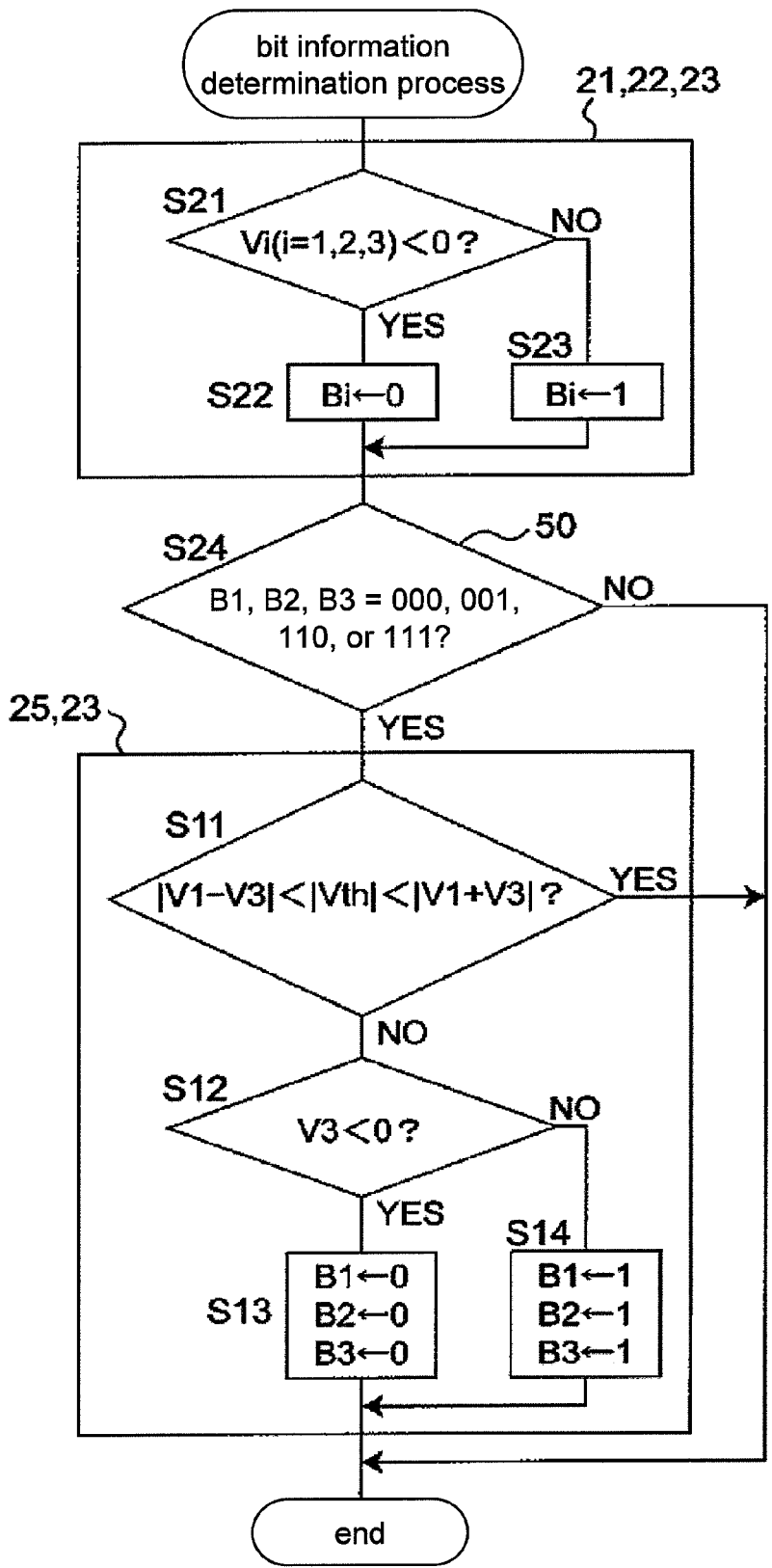
FIG. 26 is a flowchart that shows a second working example of the bit information determination process that is executed by the decoding device 50 of the signal receiver 7B in the multiple differential transmission system of FIG. 25.

In FIG. 25, the decoding device 50 is constituted by a CPU or DSP, for example, and executes a decoding process by executing the bit information determination processing of FIG. 26, which is stored on the program memory 50a, in accordance with the signals from the differential receivers 7a, 7b, and 7c and the comparator 25, in synchronization with the clock from the clock reproduction circuit 24, to produce the bit information signals B1, B2, and B3, and outputs these.

FIG. 26 is a flowchart that shows a second working example of the bit information processing that is executed by the decoding device 50 of the signal receiver 7B in the multiple differential transmission system of FIG. 25. In FIG. 26, the steps S21 to S23 are processes that are executed by the differential receivers 7a, 7b, and 7c, step S24 is a process that is executed by the decoding device 50 only, and step S11 through S14 are processes that are executed by the differential receiver 7c and the comparator 25.

In FIG. 26, first the differential receivers 7a, 7b, and 7c determine whether or not the terminal voltage Vi (i=1,2,3) of the terminal resistors 41, 42, and 43 is negative polarity, and when YES the procedure advances to step S22 and 0 is set as the bit information signal Bi, whereas when NO the procedure advances to step S23 and 1 is set as the bit information Bi, and then the procedure advances to step S24. In step S24 it is determined whether or not the bit information signals B1, B2, and B3 are 000, 001, 110, or 111, and when YES the procedure advances to step S11, whereas when NO the bit information determination process is ended. In step S11 the comparator 25 determines whether or not the absolute value |V2|=|V1+V3| of the terminal voltage V2 of the terminal resistor 43 exceeds the threshold value Vth. It should be noted that in this example, |V1−V3|<|Vth| has been set in advance in accordance with the above threshold value conditions (|Vd1−Vd3|<|Vth|). When step S11 is NO the procedure advances to step S12, and when YES the bit information determination process is ended. In step S12 it is determined whether the terminal voltage V3 of the terminal resistor 43 is negative, and when YES the procedure advances to step S13 and all bit information signals B1, B2, and B3 are set to 0, whereas when NO the procedure advances to step S14 and all bit information signals B1, B2, and B3 are set to 1.

(1.2.3: Third Multiple Differential Transmission System)

FIG. 27 is a diagram that shows the relationship between the bit information that is transmitted, the signal voltages Vs1, Vs2, and Vs3 of the transmitted signals that are transmitted over the signal lines 20a, 20b, and 20c, and the terminal voltages V1, V2, and V3, and their polarities, of the terminal resistors 41, 42, and 43 of the signal receiver 7 (or 7A), in a third multiple differential transmission system that includes the differential transmission line according to this embodiment of the invention (using the configuration of FIG. 20, differing only in the setting conditions). The third multiple differential transmission system differs from the second multiple differential transmission system only in its setting conditions, and is characterized in that Vd3<Vd1 (for example, Vd1=Vd2=1.0 V; Vd3=0.8 V). It should be noted that the structural configuration of the multiple differential transmission system of FIG. 20 is used.

Figure 28:
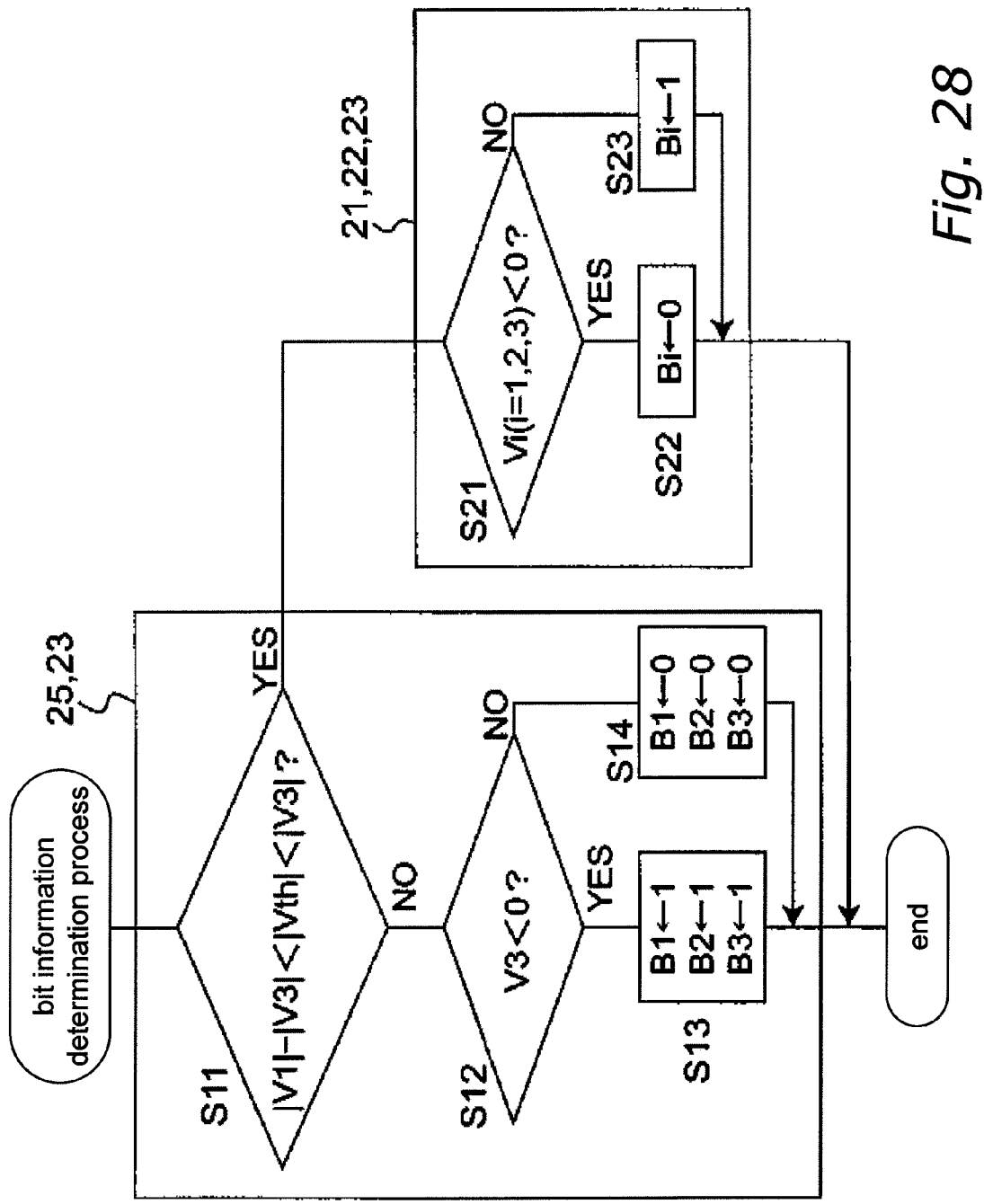
FIG. 28 is a flowchart illustrating a third working example of the bit information determination process that is executed by the differential receivers 7a, 7b, and 7c of the signal receiver 7B and the comparator 25 in the third multiple differential transmission system.

FIG. 28 is a flowchart illustrating a third working example of the bit information determination process that is executed by the differential receivers 7a, 7b, and 7c of the signal receiver 7A and the comparator 25 in the third multiple differential transmission system. The bit information determination process of FIG. 28 differs from the bit information determination process of FIG. 24 only in that the processing of step S13 has been switched with the processing of step S14. The third multiple differential transmission system having the above configuration has the same actions and effects as the second multiple differential transmission system.

MODIFIED EXAMPLE

Figure 29:
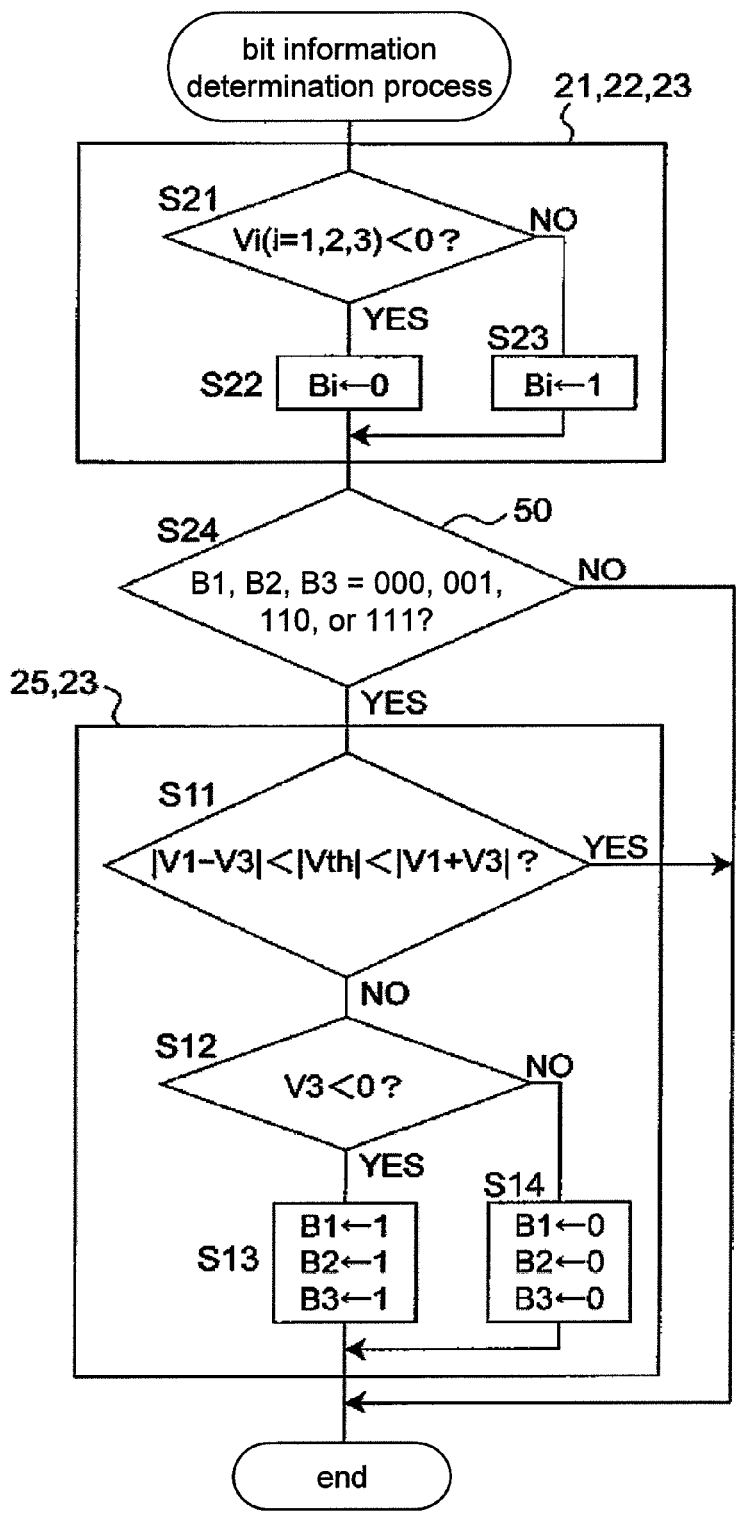
FIG. 29 is a flowchart that illustrates a fourth example of the bit information determination process that is executed by the decoding device 50 of the signal receiver 7B in a multiple differential transmission system according to a modified example of the third multiple differential transmission system (using the configuration of FIG. 25, differing only in the setting conditions).
Figure 30:
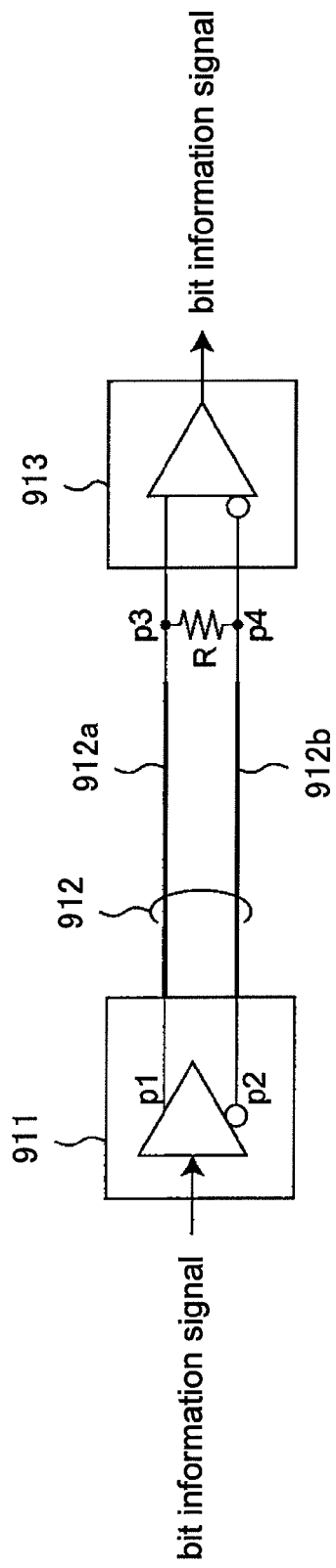
FIG. 30 is a circuit diagram of a differential transmission system according to a first conventional technology.
Figure 31:
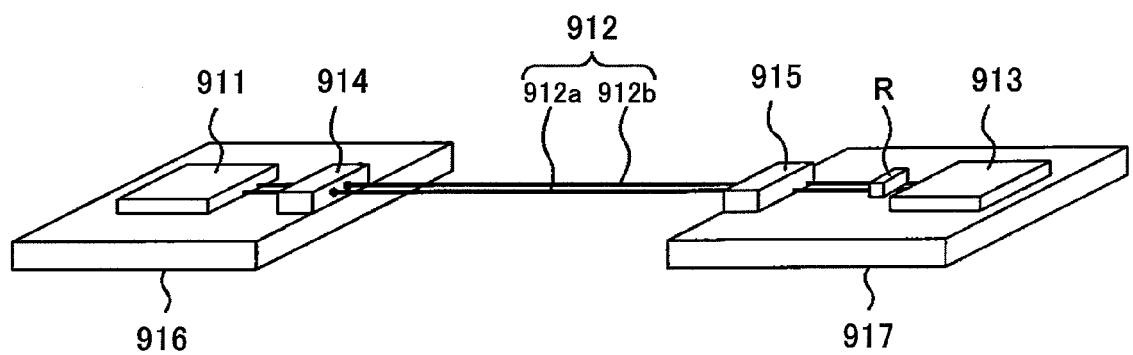
FIG. 31 is a perspective view that schematically shows the configuration of the differential transmission system of FIG. 30.

FIG. 29 is a flowchart that illustrates this example of the bit information determination process that is executed by the decoding device 50 of the signal receiver 7B in a multiple differential transmission system according to a modified example of the third multiple differential transmission system (using the configuration of FIG. 25, differing only in the setting conditions). Here, the structural configuration of the multiple differential transmission system of FIG. 25 is used. The bit information determination process of FIG. 29 differs from the bit information determination process of FIG. 26 only in that the processing of step S13 has been switched with the processing of step S14. This multiple differential transmission system according to a modified example of the third multiple differential transmission system with this configuration has the same actions and effects as the multiple differential transmission system according to the modified example of the second multiple differential transmission system.

<1.3: Characteristics of the Differential Transmission Line and Characteristics of the Differential Transmission Line Connector>

Figure 3:
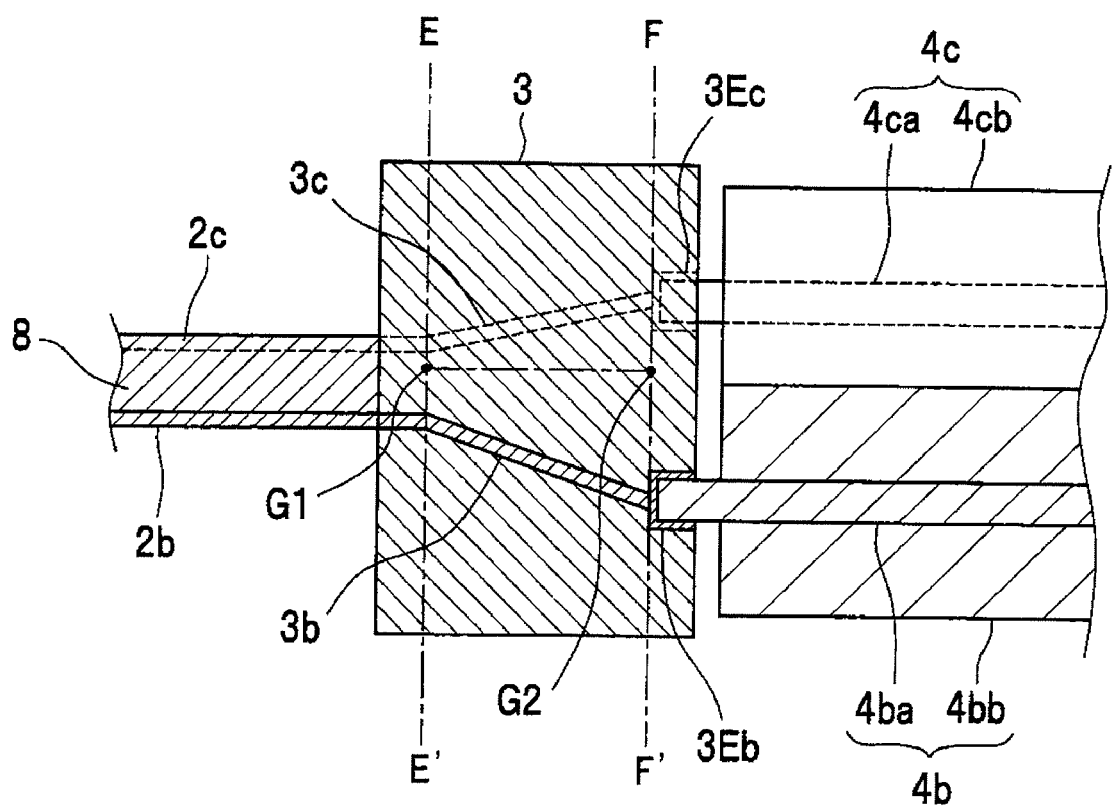
FIG. 3 is a vertical cross section showing a cut section taken along the line A-A' in FIG. 1.

Below, the characteristics of the differential transmission line and the characteristics of the differential transmission line connector 3 according to this embodiment are described in reference to FIGS. 3 to 6. FIG. 3 is a vertical cross section showing a cut section taken along line A-A' in FIG. 1, FIG. 4 is a horizontal cross section showing a cut section of the printed circuit board 8 taken along line B-B' in FIG. 1, FIG. 5 is a front view showing the configuration of the connector 3 taken along line C-C' in FIG. 1, and FIG. 6 is a horizontal cross section showing a cut section of the differential transmission cable 4 taken along line D-D' in FIG. 1.

Figure 4:
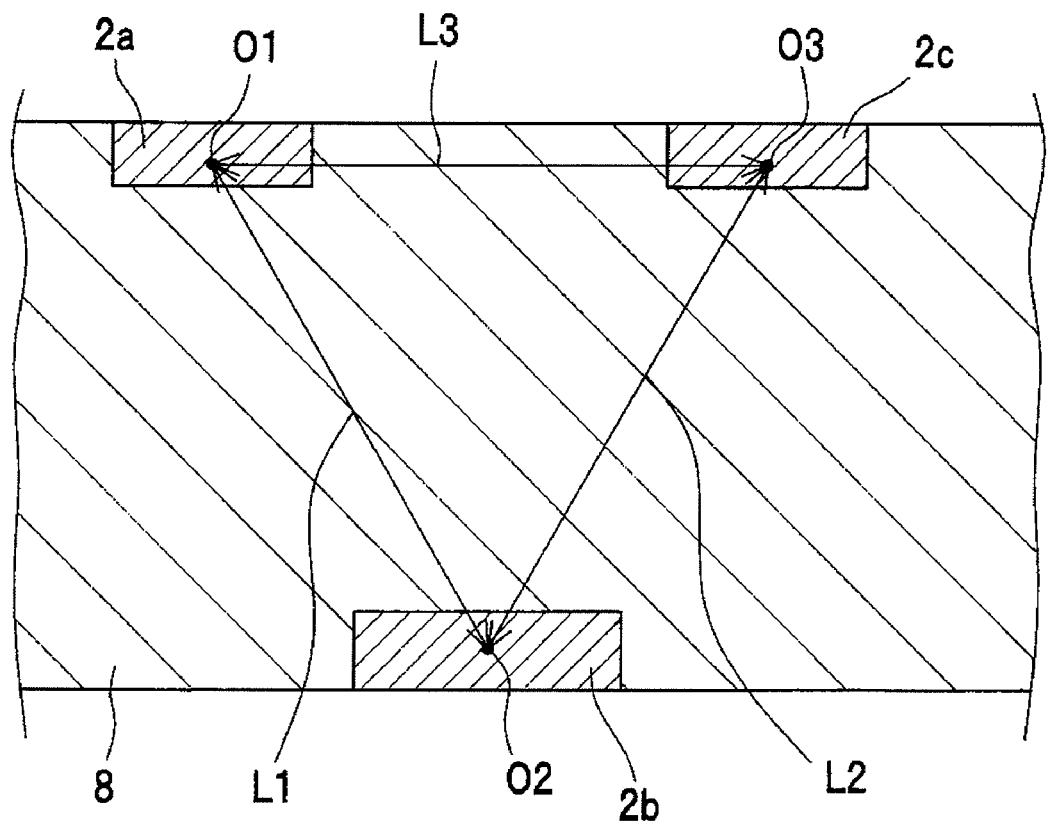
FIG. 4 is a horizontal cross section that shows a cut section of the printed circuit board 8 along the line B-B' in FIG. 1.
Figure 6:
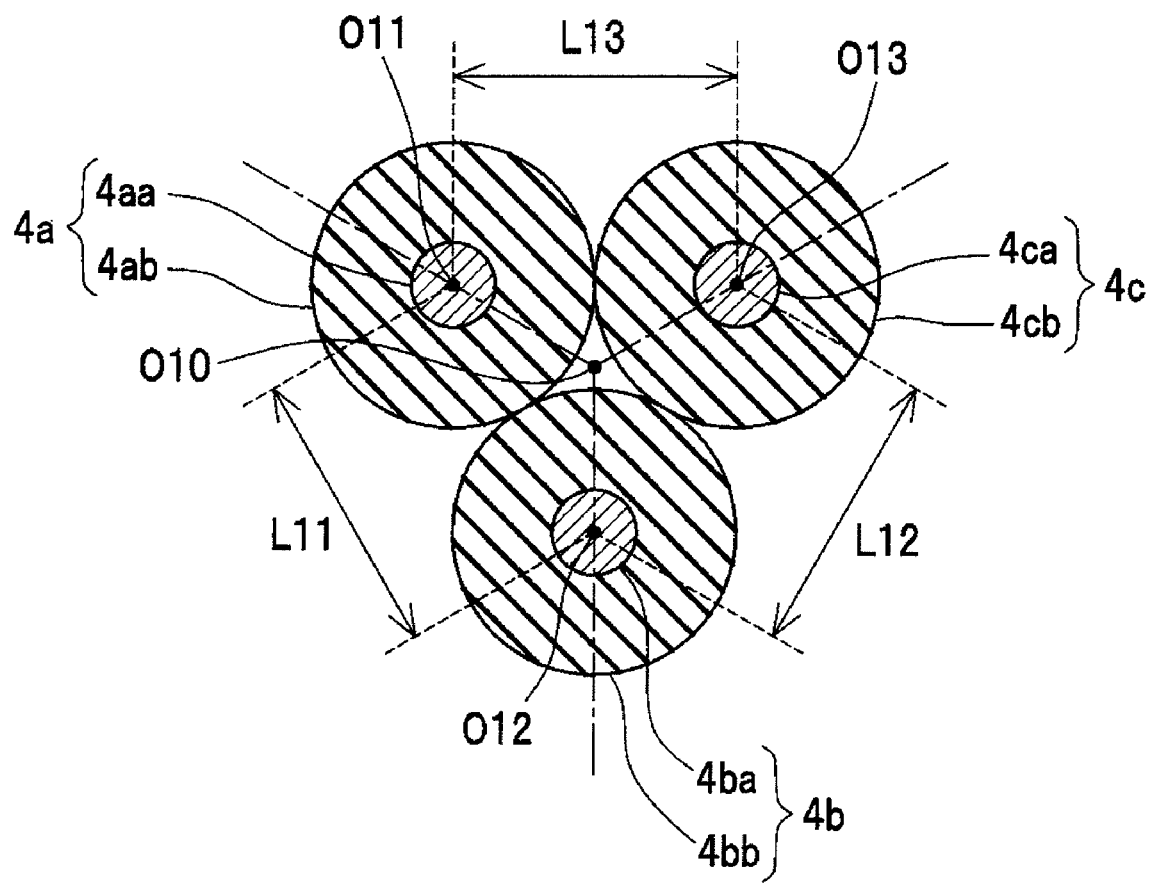
FIG. 6 is a horizontal cross section that shows a cut section of the differential transmission cable 4 taken along the line D-D' in FIG. 1.

As shown in FIGS. 4 and 6, the differential transmission line of this embodiment is configured such that in a horizontal cross section thereof, the distance between any pair of two signal lines of the three signal lines of the differential transmission line is shorter than the sum of the distances between the other two pairs of signal lines (that is, the three signal lines are positioned at the apexes of a triangle), and preferably, in a horizontal cross section the signal lines are physically equidistant, and thus in that horizontal cross section the signal lines are located at the apexes of an equilateral triangle. More specifically, first, looking at FIG. 4, the differential transmission pattern 2 of the printed circuit board 8 is composed of signal lines 2a and 2c, which are conductor patterns that are provided a predetermined distance away from one another on the upper surface of the printed circuit board 8, which is made of a dielectric material, and a signal line 2b, which is a conductor pattern that is provided a predetermined distance away from the signal lines 2a and 2c on the lower surface of the printed circuit board 8. As shown in FIG. 4, in this embodiment the physical distance between the centers of the signal lines 2a, 2b, and 2c in a horizontal section is equal (L1=L2=L3). Further, in this embodiment, after the patterns for the signal lines 2a, 2b, and 2c are formed by etching, for example, a dielectric material that is the same as the printed circuit board 8 is laminated so as to bury the signal lines 2a, 2b, and 2c. Thus, in the differential transmission pattern 2, the spaces between the signal liens 2a, 2b, and 2c are filled by the same dielectric material, and thus the signal lines 2a, 2b, and 2c are equally spaced from one another in terms of electricity as well. The differential driver IC1 is provided on the upper surface of the printed circuit board 8, and two of its three output terminals are connected to the signal lines 2a and 2c, and its other output terminal is connected to the signal lines 2b through the printed circuit board 8 through a via conductor, for example, and the signal lines 2a, 2b, and 2c extend from their output terminal on the differential driver IC1 to the end surface of the printed circuit board 8. With the differential transmission pattern 2 of this embodiment, in any horizontal section that is perpendicular to the longitudinal direction of the differential transmission pattern 2, the lengths of the signal lines 2a, 2b, and 2c from the output terminals of the differential driver IC1 are equal to one another. In the differential transmission pattern 6 of the printed circuit board 9 as well, like with the differential transmission pattern 2, the physical and electrical distances between the centers of the signal lines 6a, 6b, and 6c in horizontal cross section are equal. Further, looking at FIG. 6, the signal lines 4a, 4b, and 4c of the differential transmission cable 4 are made of center conductors 4aa, 4ba, and 4ca, and insulating covering 4ab, 4bb, and 4cc made of rubber or vinyl that is provided around the center conductor, and they each also share the same cross-sectional shape, and in particular, the center conductors 4aa, 4ba, and 4ca have the same cross-sectional area. As shown in FIG. 6, in this embodiment, the physical distances between the centers of the signal lines 4a, 4b, and 4c in horizontal cross section are equal (L11=L12=L13). Therefore, the physical distance between any pair of signal lines 4a, 4b, and 4c is equal to a predetermined value, and moreover, as shown in FIG. 6, the differential transmission cable 4 made from the signal lines 4a, 4b, and 4c has 120-degree rotational symmetry in horizontal cross section. Providing the differential transmission line of this embodiment with the form described above has the effect that the three signal lines can be easily kept at an equal spacing, and thus the differential impedances can be kept constant and the electromagnetic fields that are generated by the signal currents can cancel each other out, and therefore it is possible to achieve a multiple differential transmission cable with little unwanted radiation noise.

Figure 32:
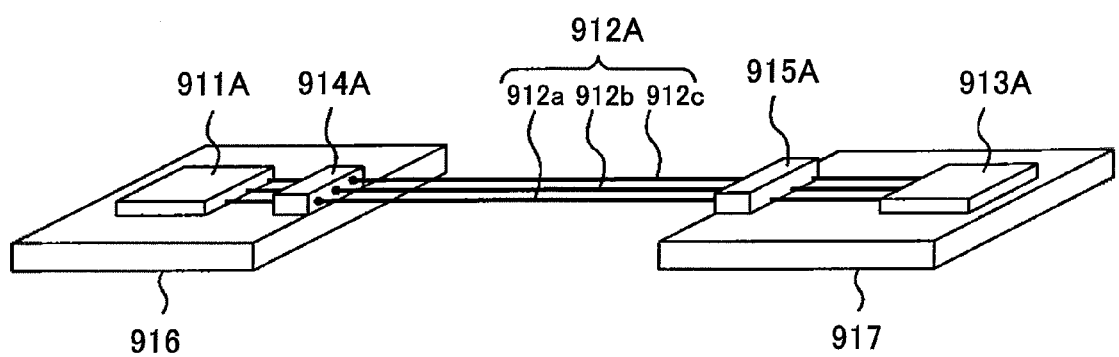
FIG. 32 is a perspective view that schematically shows the configuration of a differential transmission system according to a second conventional technology.
Figure 33:
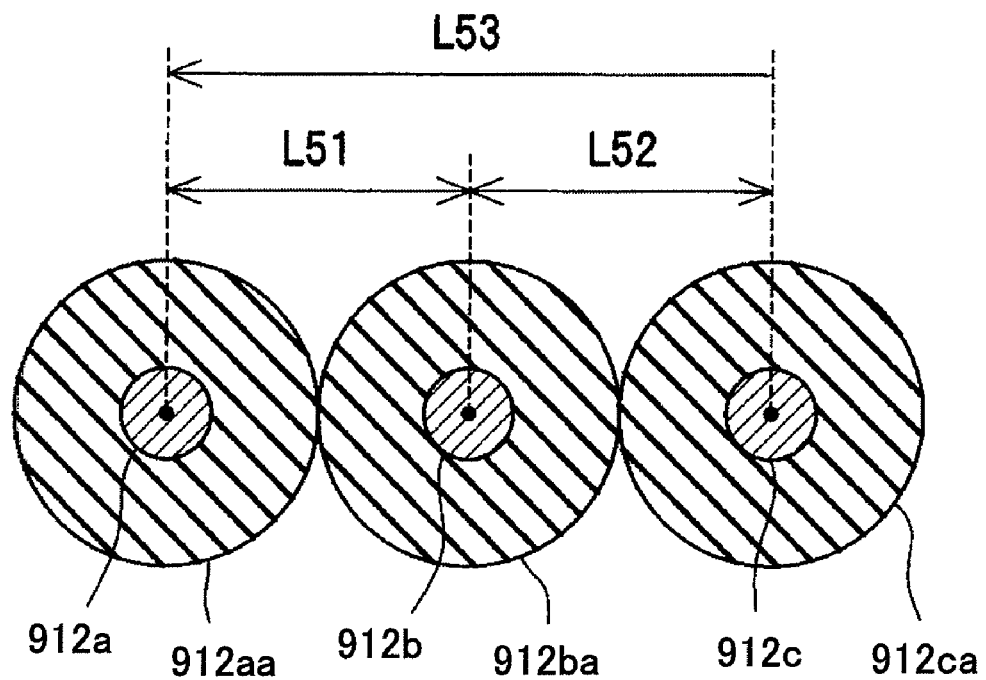
FIG. 33 is a horizontal cross section of the differential transmission cable 912A of FIG. 32.

The differential transmission pattern 2 and the differential transmission cable 4 shown in FIGS. 4 and 6 cannot be connected by the connectors 914A and 915A of the conventional art shown in FIG. 32. A connector that can connect the signal lines of the differential transmission pattern 2 and the differential transmission cable 4 of this embodiment at equal lengths and also keep the distances between the signal lines equal to one another did not exist in the conventional art. Thus, this raises the new issue of how to achieve differential transmission with little unwanted radiation noise in which the electromagnetic fields that are generated by the signal currents cancel each other out over the entire length of the differential transmission line, including the connections through the connector, without delaying the signals delay, and this issue can be solved by the connector 3 of this embodiment, which is described below.

Figure 5:
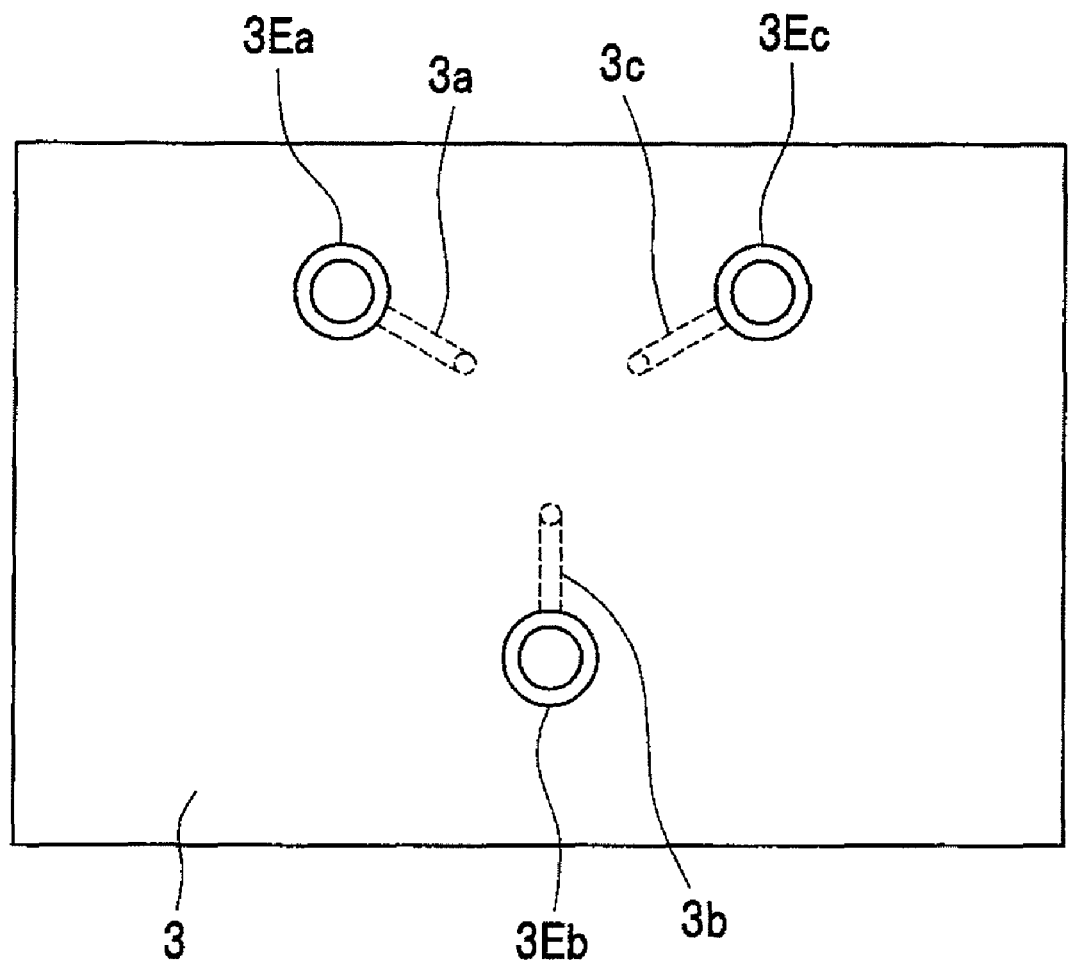
FIG. 5 is a front view that shows the configuration of the connector 3 taken along the line C-C' in FIG. 1.

As shown in FIGS. 3 and 5, the connector 3, which is formed in a substantially rectangular solid shape by a dielectric resin, at one surface is linked to the end surface of the printed circuit board 8, and at its other surface, which is in opposition to the surface that is linked to the printed circuit board 8, is provided with terminals 3Ea, 3Eb, and 3Ec for connecting the signal lines 4a, 4b, and 4c of the differential transmission cable 4. The surface of the connector 3 that is linked to the printed circuit board 8 is preferably provided perpendicular to the longitudinal direction of the differential transmission pattern 2. The connector 3 is also provided with signal lines 3a, 3b, and 3c of equal lengths that are buried within its interior, and one end of each signal line 3a, 3b, and 3c is exposed to the outside of the connector 3 at the surface that is linked to the printed circuit board 8 and is electrically connected to the signal lines 2a, 2b, and 2c of the differential transmission pattern 2 by soldering, for example, whereas the other ends of the signal lines 3a, 3b, and 3c are electrically connected to the terminals 3Ea, 3Eb, and 3Ec, respectively. By doing this, the signal lines 3a, 3b, and 3c of the connector 3 connect the three signal lines 2a, 2b, and 2c of the differential transmission pattern 2 to the three signal lines 4a, 4b, and 4c of the differential transmission cable 4 at equal lengths, between a predetermined first plane that intersects the longitudinal direction of the differential transmission pattern 2 (for example, the cut section along the line B-B' of FIG. 1; or, the surface that includes the three output terminals of the differential driver IC1) and a predetermined second plane that intersects the longitudinal direction of the differential transmission cable 4 (for example, the cut section along the line D-D' of FIG. 1). At the same time, the one ends of the signal lines 3a, 3b, and 3c that is connected to the signal lines 2a, 2b, and 2c of the differential transmission pattern 2 are provided separated from one another by an equal distance (L1=L2=L3), like the centers of the signal lines 2a, 2b, and 2c shown in FIG. 4, and the terminals 3Ea, 3Eb, and 3Ec are provided separated from one another by an equal distance (L11=L12=L13) like the center conductors 4aa, 4ba, and 4ca of the signal lines 4a, 4b, and 4c of the differential transmission cable 4 shown in FIG. 6. Further, the signal lines 3a, 3b, and 3c are provided equal distance from one another in any surface that includes points of the signal lines 3a, 3b, and 3c, which are routes of a same length from the three output terminals of the differential driver IC1, respectively. Here, a surface that includes points of the signal lines 3a, 3b, and 3c, which are routes of the same length from the three output terminals of the differential driver IC1, respectively, is between the surface of the connector 3 that is linked to the printed circuit board 8 and the surface of the connector 3 that is in opposition to this, and it has a horizontal cross section that is parallel to these surfaces, and further, it may also be viewed as a flat plane that is substantially perpendicular to the longitudinal direction of the signal lines 3a, 3b, and 3c.

The distances (L1=L2=L3) between the signal lines 2a, 2b, and 2c of the differential transmission pattern 2 are not necessarily identical to the distances (L11=L12=L13) between the signal lines 4a, 4b, and 4c of the differential transmission cable 4. In this embodiment, it is presumed that the latter is longer. For this reason, the connector 3 of this embodiment switches the distances between the signal lines. In this embodiment, the signal lines 3a, 3b, and 3c of the connector 3 are formed in a straight line such that the distances between the signal lines 3a, 3b, and 3c gradually expand from the section near the differential transmission pattern 2 of the printed circuit board 8 (shown by the straight line E-E' in FIG. 3) up to the section that is near the differential transmission cable 4 (shown by the straight line F-F' in FIG. 3). In the segment where the distances between the signal lines 3a, 3b, and 3c gradually expand, the center of the triangle whose apexes are the points of the signal lines 3a, 3b, and 3c, which are the same length from the three output terminals of the differential driver IC1, is always on the line G1-G2 perpendicular to the surface that includes that triangle. It should be noted that if the distances (L1=L2=L3) between the signal lines 2a, 2b, and 2c of the differential transmission pattern 2 are identical to the distances (L11=L12=L13) between the signal lines 4a, 4b, and 4c of the differential transmission cable 4, then, naturally, the signal lines 3a, 3b, and 3c of the connector 3 are provided parallel to one another.

The terminals 3Ea, 3Eb, and 3Ec retain within them the central conductors 4aa, 4ba, and 4ca of the signal lines 4a, 4b, and 4c of the differential transmission cable 4 and establish electrical contact. Preferably, the connector 3 and the differential transmission cable 4 each are further provided with a detachable lock mechanism for establishing mechanical contact with one another, but in FIG. 3 this has been omitted for the sake of simplifying the drawing.

The connector 5 has the same configuration as the connector 3, and connects the signal lines 4a, 4b, and 4c of the differential transmission cable 4 and the signal lines 6a, 6b, and 6c of the differential transmission pattern 6 of the printed circuit board 9.

As described above, the differential transmission line connectors 3 and 5 of this embodiment are internally furnished with three signal lines having the same length, and the distances between the signal lines can always be kept equal, and thus the electromagnetic fields that are generated by the signal currents cancel each other out without causing a delay in the signals, and thus it is possible to achieve multiple differential transmission with little unwanted radiation noise.

Second Embodiment

Figure 7:
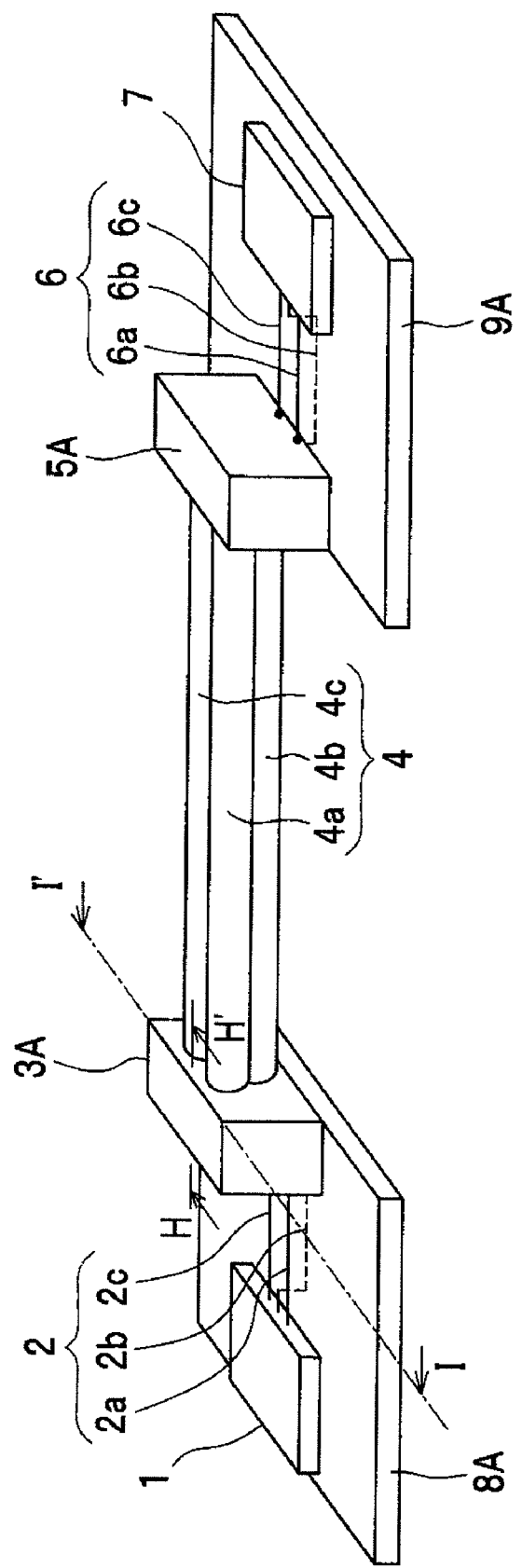
FIG. 7 is a perspective view that shows the configuration of a differential transmission system according to a second embodiment of the invention.
Figure 8:
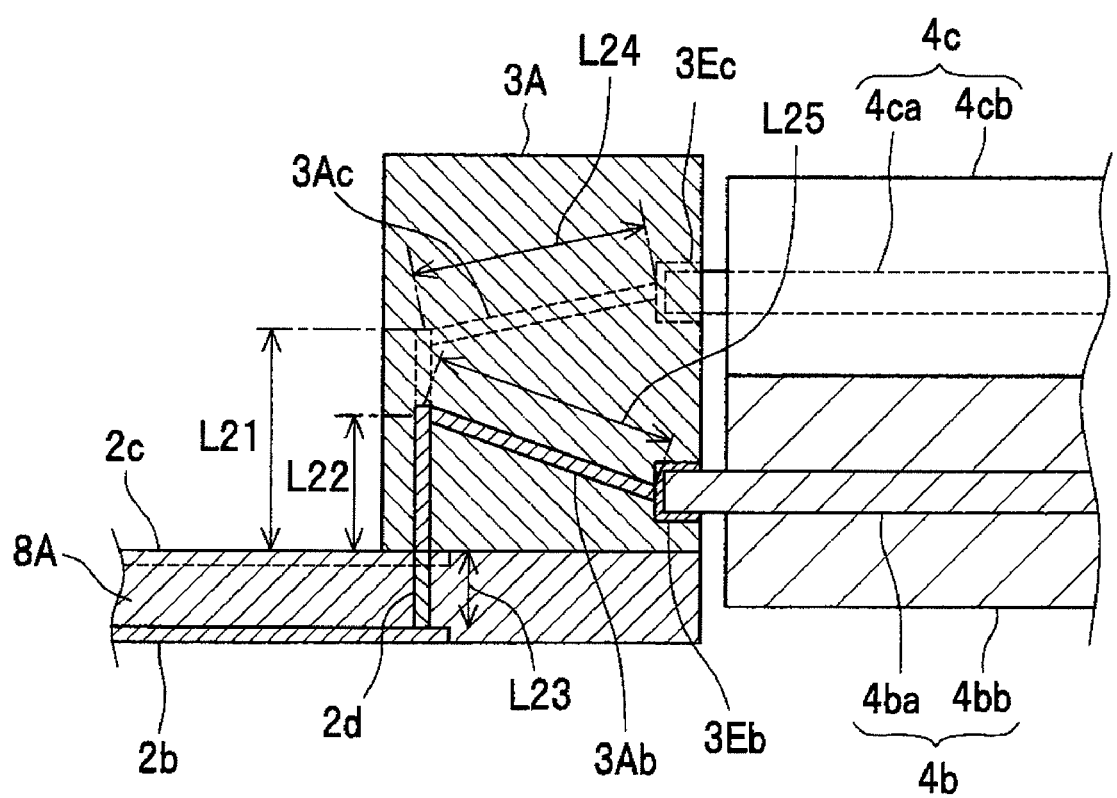
FIG. 8 is a vertical cross section showing a cut section taken along the line H-H' in FIG. 7.
Figure 9:
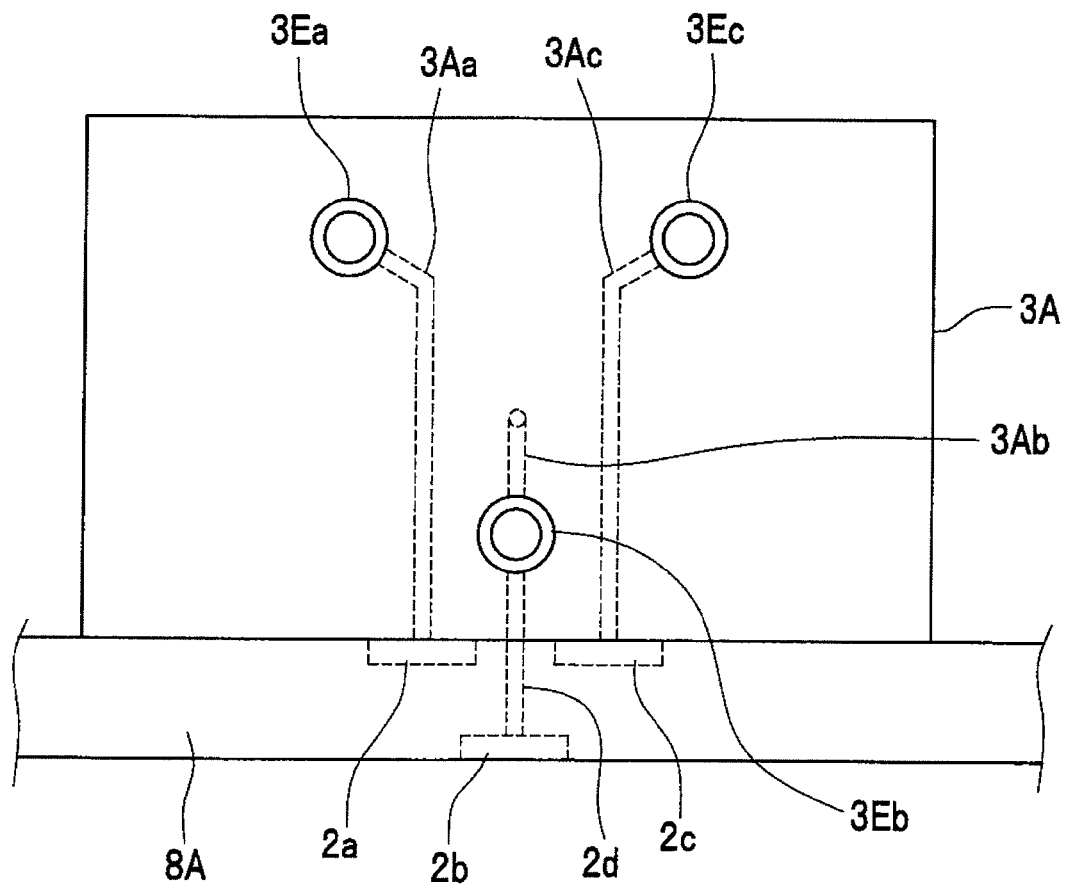
FIG. 9 is a front view showing the configuration of a connector 3A taken along the line I-I' in FIG. 7.

FIG. 7 is a perspective view showing the configuration of a differential transmission system according to a second embodiment of the invention, FIG. 8 is a vertical cross section showing a cut section taken along line H-H' in FIG. 7, and FIG. 9 is a front view showing the configuration of the connector 3A along the line I-I' in FIG. 7. This embodiment is characterized in that connectors 3A and 5A that are provided on the upper surface of printed circuit boards 8A and 9A are provided in lieu of the connectors 3 and 5 that were provided on the end surfaces of the printed circuit boards 8 and 9 in the first embodiment.

The features of the differential transmission line connector 3A according to this embodiment are described below with reference to FIGS. 8 and 9. In this embodiment, the differential transmission pattern 2 of the printed circuit board 8A extends from the output terminals of the differential driver IC1 to a predetermined location on the printed circuit board 8A on which to provide the connector 3A. The horizontal cross section of the differential transmission pattern 2 of the printed circuit board 8A is identical to the case of the printed circuit board 8 in the first embodiment, which is illustrated by FIG. 4. The printed circuit board 8A is also furnished with a via conductor 2d that passes through the printed circuit board 8A from its lower surface to its upper surface, and its end point on the side removed from the differential driver IC1 at the signal line 2b extends up to the upper surface of the printed circuit board 8A. Consequently, the upper end of the via conductor 2d is located on the upper surface of the printed circuit board 8A in the middle between the end portions on the sides away from the differential driver IC1 at the signal lines 2a and 2c. The connector 3A, which is formed in a substantially rectangular solid shape by a dielectric resin, is provided such that at its bottom surface it is in contact with the upper surface of the printed circuit board 8A, and in its lateral surface it is provided with terminals 3Ea, 3Eb, and 3Ec, like in the first embodiment, for connecting with the signal lines 4a, 4b, and 4c of the differential transmission cable 4. The connector 3A is also furnished with signal lines 3Aa, 3Ab, and 3Ac that are provided buried within it, and that connect the three signal lines 2a, 2b, and 2c of the differential transmission pattern 2 and the three signal lines 4a, 4b, and 4c of the differential transmission cable 4, respectively, at equal lengths between a predetermined first plane that perpendicularly intersects the longitudinal direction of the differential transmission pattern 2 and a predetermined second plane that perpendicularly intersects the longitudinal direction of the differential transmission cable 4. One end of the signal lines 3Aa, 3Ab, and 3Ac is exposed to the bottom surface of the connector 3A and is electrically connected to the signal line 2a, the via conductor 2d, and the signal line 2c, respectively, by soldering, for example, whereas the other ends of the signal lines 3Aa, 3Ab, and 3Ac is electrically connected to the terminals 3Ea, 3Eb, and 3Ec, respectively.

In this embodiment, the signal lines 3Aa, 3Ab, and 3Ac of the connector 3A have a parallel segment in which they run parallel to one another perpendicular to the printed circuit board 8A, and a distance adjustment segment for adjusting the distance between signal lines that is provided substantially horizontally (that is, the direction substantially parallel to the longitudinal direction of the differential transmission cable 4). Here, a plane that includes the parallel segments of the signal lines 3Aa, 3Ab, and 3Ac is parallel to the surface in which the terminals 3Ea, 3Eb, and 3Ec are provided in the connector 3A. The parallel segments of the signal lines 3Aa, 3Ab, and 3Ac are provided extending at a 90-degree angle upward from the end portion of the signal line 2a, the end portion of the via conductor 2d, and the end portion of the signal line 2c on the printed circuit board 8A. At this time, the length L21 of the parallel segment of the signal line 3Aa, the sum of the length L23 of the via conductor 2d and the length L22 of the parallel segment of the signal line 3Ab, and the length L21 of the parallel segment of the signal line 3Ac are equal to one another. That is to say, the structure is such that L21=L22+L23.

Thus, the upper end portions of the parallel segments of the signal lines 3Aa, 3Ab, and 3Ac are provided separated by an equal distance (L1=L2=L3) like the centers of the signal lines 2a, 2b, and 2c in the horizontal section of the differential transmission pattern 2. The distance adjustment segments of the signal lines 3Aa, 3Ab, and 3Ac are provided extending from the upper ends of the parallel segment toward the terminals 3Ea, 3Eb, and 3Ec, respectively. At this time, the length L24 of the distance adjustment segment of the signal line 3Aa, the length L25 of the distance adjustment segment of the signal line 3Ab, and the length L24 of the distance adjustment segment of the signal line 3Ac are equal to one another, and moreover, the signal lines 3Aa, 3Ab, and 3Ac are separated from one another by an equal distance in any plane that substantially perpendicularly intersects the longitudinal direction of the distance adjustment segments of the signal lines 3Aa, 3Ab, and 3Ac (more specifically, any plane that includes points within the distance adjustment segments of the signal lines 3Aa, 3Ab, and 3Ac, which are paths of equal length from the three output terminals of the differential driver IC1). Consequently, the distance adjustment segments of the signal lines 3Aa, 3Ab, and 3Ac are the same as the segment of the signal lines 3a, 3b, and 3c of the connector 3 of FIG. 3 that is sandwiched between the line E-E' and the line F-F'. It should be noted that if the distance between the signal lines 2a, 2b, and 2c of the differential transmission pattern 2 (L1=L2=L3) is the same as the distance between the signal lines 4a, 4b, and 4c of the differential transmission cable 4 (L11=L12=L13), then, naturally, the distance adjustment segments of the signal lines 3Aa, 3Ab, and 3Ac of the connector 3A are provided parallel to one another.

The connector 5A similarly has the same configuration as the connector 3A, and connects the signal lines 4a, 4b, and 4c of the differential transmission cable 4 and the signal lines 6a, 6b, and 6c of the differential transmission pattern 6 of the printed circuit board 9A.

As described above, the differential transmission line connectors 3A and 5A of this embodiment connect the three signal lines at equal lengths and can also always keep the distance between the signal lines equal with the distance adjustment segments, and thus the electromagnetic fields that are generated by the signal currents can cancel each other out without causing a delay in the signals, and therefore it is possible to achieve multiple differential transmission in which there is little unwanted radiation noise. Further, with the differential transmission line connectors 3A and 5A of this embodiment, there is no limitation to providing the connectors 3 and 5 at the end surfaces of the printed circuit boards 8 and 9 like in the first embodiment, and thus it is possible to increase the degree of freedom for mounting the connectors 3A and 5A on the printed circuit boards 8A and 9A.

Third Embodiment

A differential transmission line connector 3B according to a third embodiment of the invention is described below. The overall configuration of the differential transmission system according to this embodiment is like the configuration that is shown in FIG. 7. In the first and second embodiments, the differential transmission patterns 2 and 6 of the printed circuit boards 8, 9, 8A, and 9A were laminated with a dielectric material in order to bury the signal lines, but in this embodiment, this extra lamination process is omitted. Thus, in this embodiment, it is necessary to change the physical distance between the signal lines 2a, 2b, and 2c in order to keep the electrical distance between the signal lines 2a, 2b, and 2c equal, and the connector 3B of this embodiment is characterized in that it changes the shape of the horizontal cross section of the signal lines.

Figure 10:
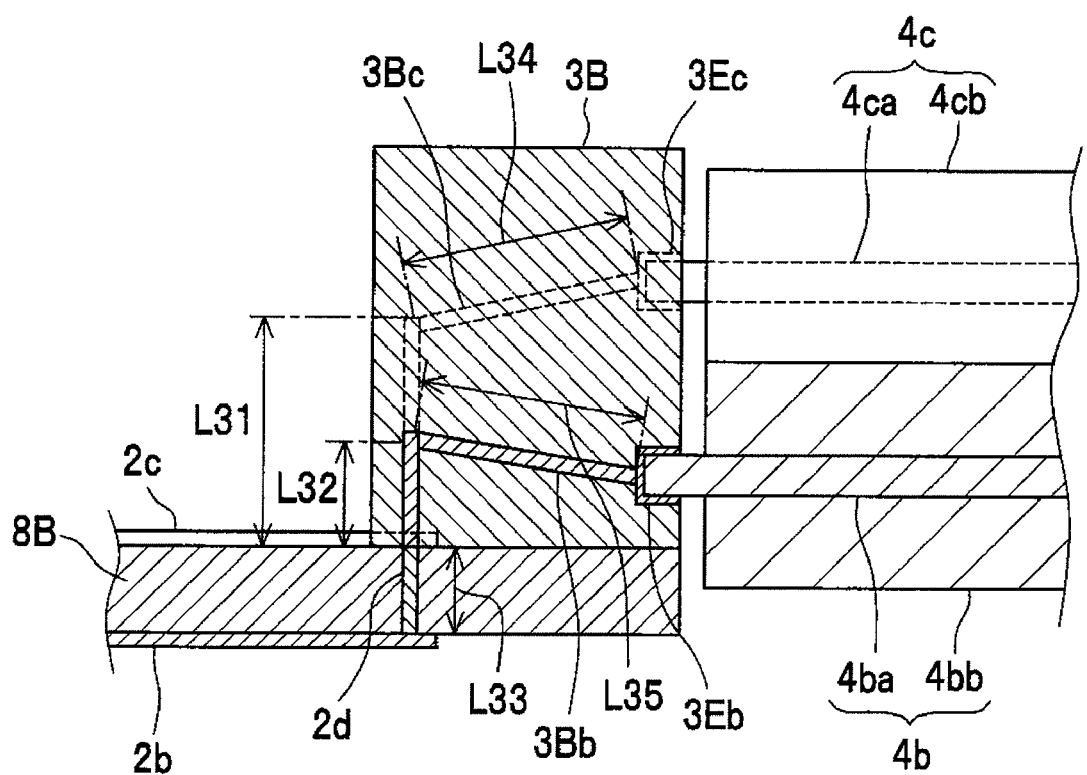
FIG. 10 is a vertical cross section that shows the configuration of a connector 3B according to a third embodiment of the invention.
Figure 11:
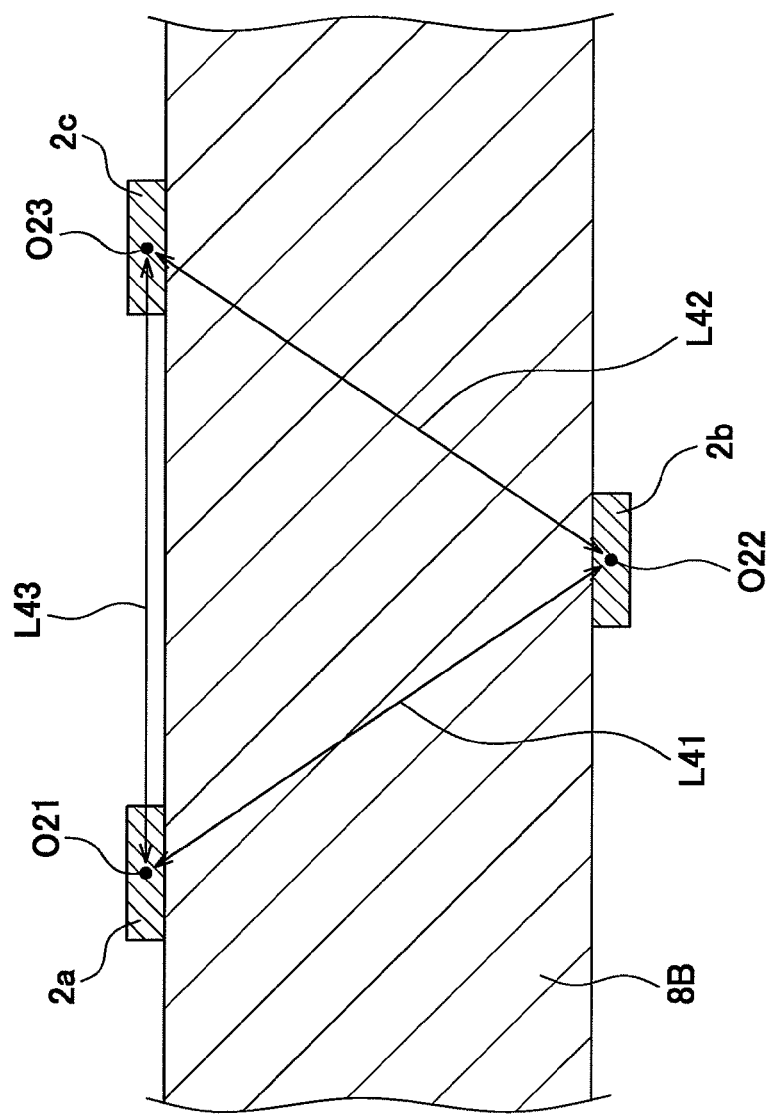
FIG. 11 is a horizontal cross section that shows a cut section of the printed circuit board 8B according to the third embodiment of the invention.
Figure 12:
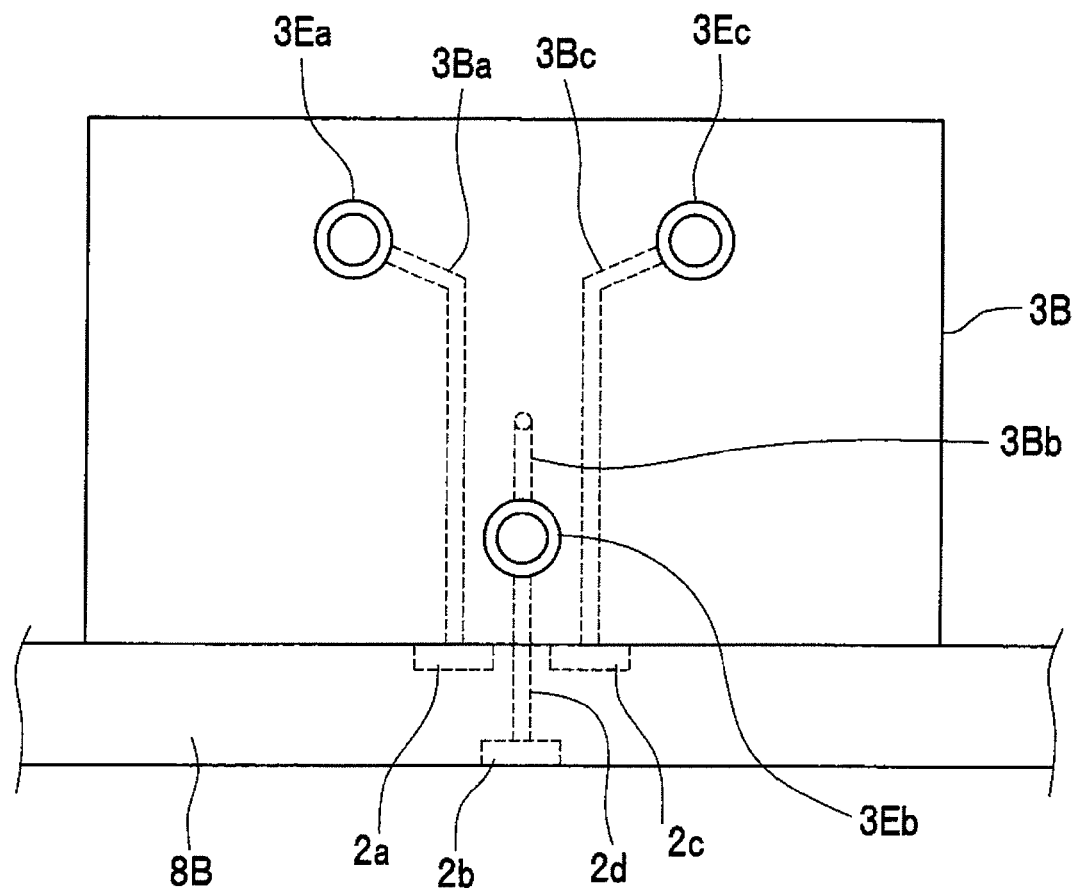
FIG. 12 is a front view that shows the configuration of the connector 3B of FIG. 10.

FIG. 10 is a vertical cross section that shows the configuration of the connector 3B according to this embodiment. FIG. 11 is a horizontal cross section that shows a cut section of a printed circuit board 8B according to this embodiment, and shows a cut section of the printed circuit board 8B at a position that is in opposition to the line B-B' of FIG. 1. FIG. 12 is a front view that shows the configuration of the connector 3B of FIG. 10, and is a front view of the connector 3B at a position that opposes the line I-I' of FIG. 7. In FIG. 11, the space between the signal lines 2a and 2c is filled by air, and the space between the signal lines 2a and 2b, and the space between the signal lines 2b and 2c, is filled by a dielectric material, and thus in order to set an equal electrical distance between the signal lines 2a, 2b, and 2c, the distance L41 between the signal lines 2a and 2b and the distance L42 between the signal lines 2b and 2c are made longer than the distance L43 between the signal lines 2a and 2c (L41=L42<L43).

A specific method to "set an equal electrical distance" is described here.

When $\in r$ is the dielectric constant of the dielectric material that fills in the space between the signal lines 2a and 2b, and the space between the signal lines 2b and 2c, and $\in ro$ is the dielectric constant of the substance that fills in the space between the signal lines 2a and 2c, then by setting L41, L42, and L43 so as to satisfy the relationship:

$$L43 = L41 \cdot \text{sqrt}(\in r/\in ro)$$

$$L43 = L42 \cdot \text{sqrt}(\in r/\in ro)$$

(where sqrt(x) represents the square root of x)

it is possible to "set an equal electrical distance."

It should be noted that in the case of FIG. 11, the substance that fills the space between the signal lines 2a and 2c is air, and thus it is possible to approximate $\in ro=1$, so that in the case of FIG. 11, by setting L41, L42, and L43 so as to satisfy the relationship:

$$L43 = L41 \cdot \text{sqrt}(\in r)$$

$$L43 = L42 \cdot \text{sqrt}(\in r)$$

(where sqrt(x) represents the square root of x)

it is possible to "set an equal electrical distance." In other words, by disposing the signal lines 2a, 2b, and 2c so that the distances L41, L42, and L43 satisfy the above relationship, the electrical distances between the signal lines 2a, 2b, and 2c can be made equal.

Looking at FIGS. 10 and 12, the signal lines 3Ba, 3Bb, and 3Bc of the connector 3B of this embodiment, like the signal lines 3Aa, 3Ab, and 3Ac of the connector 3A of the second embodiment, are provided with parallel segments that are provided parallel to one another in the vertical direction, and distance adjustment segments for adjusting the distance between signal lines that are provided in substantially the horizontal direction. The configuration is such that length L31 of the parallel segment of the signal line 3Ba, the sum of the length L33 of the via conductor 2d and the length L32 of the parallel segment of the signal line 3Bb, and the length L31 of the parallel segment of the signal line 3Bc, are equal to one another. That is, the configuration is such that $$L31 = L32 + L33.$$

Consequently, the upper end portion of the parallel segments of the signal lines 3Ba, 3Bb, and 3Bc are provided located at the apexes of an isosceles triangle, like the centers of the signal lines 2a, 2b, and 2c in the horizontal cross section of the differential transmission pattern 2 of FIG. 11. The distance adjustment segments of the signal lines 3Ba, 3Bb, and 3Bc extend from the upper end portion of the parallel segments toward the terminals 3Ea, 3Eb, and 3Ec. At this time, the configuration is such that the length L34 of the distance adjustment segment of the signal line 3Ba, the length L35 of the distance adjustment segment of the signal line 3Bb, and the length L34 of the distance adjustment segment of the signal line 3Bc are equal to one another. The distance adjustment segments of the signal lines 3Ba, 3Bb, and 3Bc are formed such that in any plane that substantially perpendicularly intersects the longitudinal direction of the distance adjustment segments of the signal lines 3Ba, 3Bb, and 3Bc (more specifically, any plane that includes points within the distance adjustment segments of the signal lines 3Ba, 3Bb, and 3Bc, which are paths of the same length from the three output terminals of the differential driver IC1), the shape of the triangle whose apexes are the signal lines 3Ba, 3Bb, and 3Bc gradually changes from an isosceles triangle into an equilateral triangle, and substantially becomes an equilateral triangle in a predetermined segment that is proximate to the terminals 3Ea, 3Eb, and 3Ec (that is, the distances between the signal lines 3Ba, 3Bb, and 3Bc become L11=L12=L13).

With the differential transmission line connector 3B of this embodiment, it is not necessary to position both the signal lines 2a, 2b, and 2c of the differential transmission pattern 2 and the signal lines 4a, 4b, and 4c of the differential transmission cable 4 at the apexes of an equilateral triangle, and it is also possible for one set of signal lines to be positioned at the apexes of a triangle whose shape is not an equilateral triangle (such as an isosceles triangle).

As described above, the differential transmission line connector 3B of this embodiment can connect the three signal lines with the same length, and thus the electromagnetic fields that are generated by the signal currents can cancel each other out, without delaying the signals, and therefore it is possible to achieve multiple differential transmission in which there is little unwanted radiation noise. Further, with the differential transmission line connector 3B of this embodiment, it is not necessary to laminate a dielectric material in order to bury the signal lines of the differential transmission patterns 2 and 6 of the printed circuit boards 8, 8A, 9, and 9A like in the first and second embodiments, and thus production of the differential transmission line can be simplified.

MODIFIED EXAMPLES

The above embodiments were described with the odd mode impedance of the differential transmission cable (differential transmission line 20) set at 50 Ω and its differential impedance set at 100 Ω, but it is also possible to set the impedances to other values. The above embodiments describe an example in which three differential driver circuits 1a, 1b, and 1c are formed in the differential driver IC1, and three terminal resistors Ra, Rb, and Rc and three differential receiver circuits 7a, 7b, and 7c are formed in the differential receiver IC7, but the effects are the same when a plurality of ICs each of which has a single circuit formed are mounted onto the printed circuit boards 8, 8A, 9, and 9A. The above embodiments describe an example in which terminal resistors Ra, Rb, and Rc are formed in the differential receiver IC7, but the same effects are achieved when the terminal resistors Ra, Rb, and Rc are mounted onto the printed circuit boards 9 and 9A as external components.

In the embodiments described above, the printed circuit boards 8, 8A, 9, and 9A are double-sided boards, but it is also possible for them to be multilayer boards with three or more layers. In this case, the signal lines 2a, 2b, and 2c of the differential transmission pattern 2 and the signal lines 6a, 6b, and 6c of the differential transmission pattern 6 are formed on a plurality of conductor layers of the printed circuit boards, which are multilayer boards. The above embodiments are described using LVDS as an example, but the same effects are obtained with other differential transmission methods as well.

In the first embodiment, the differential transmission patterns 2 and 6 of the printed circuit boards 8 and 9 were laminated with a dielectric material so as to bury the signal lines, but it is also possible to omit this extra lamination process as in the third embodiment. In this case, the differential transmission line connector 3 of the first embodiment will change the physical distance between the signal lines 2a, 2b, and 2c so as to alter the horizontal cross-sectional shape of the signal lines, in order to make the electrical distance between the signal lines 2a, 2b, and 2c equal. Consequently, the signal lines are formed such that in any plane that substantially perpendicularly intersects the longitudinal direction of the signal lines (more specifically, any plane that includes points of the signal lines within the connector, which are routes of the same length from the three output terminals of the differential driver IC1), the shape of the triangle whose apexes are the signal lines gradually changes from an isosceles triangle into an equilateral triangle, and substantially forms an equilateral triangle in a predetermined segment that is proximate to the terminals 3Ea, 3Eb, and 3Ec (that is, the distances between the signal lines are L11=L12=L13).

ATTACHMENTS

The present invention can also be represented as follows.
(Attachment 1)
A differential transmission line connector for connecting first and second differential transmission lines, each of which is provided with three signal lines and performs multiple transmission of a group of three differential signals,
 wherein in a plane that perpendicularly intersects the longitudinal direction of the first differential transmission line, the three signal lines of the first differential transmission line are positioned at the apexes of a first triangle;
 wherein in a plane that perpendicularly intersects the longitudinal direction of the second differential transmission line, the three signal lines of the second differential transmission line are positioned at the apexes of a second triangle; and
 wherein the differential transmission line connector is provided with three signal lines that connect, at identical lengths, the three signal lines of the first differential transmission line and the three signal lines of the second differential transmission line, between a predetermined first plane of the planes that perpendicularly intersect the longitudinal direction of the first differential transmission line and a predetermined second plane of the planes that perpendicularly intersect the longitudinal direction of the second differential transmission line.
(Attachment 2)
The differential transmission line connector according to attachment 1,
 wherein at least one of the first triangle and the second triangle is an equilateral triangle.
(Attachment 3)
The differential transmission line connector according to attachment 1,
 wherein both the first triangle and the second triangle are equilateral triangles.
(Attachment 4)
The differential transmission line connector according to attachment 3,
 wherein the length of the edges of the first triangle is different from the length of the edges of the second triangle.
(Attachment 5)
The differential transmission line connector according to any one of attachments 2 through 4,
 wherein the three signal lines of the first differential transmission line are formed in a plurality of conductor layers of a printed circuit board that is a multilayer board, and extend up to an end surface of the printed circuit board;
 wherein the differential transmission line connector is connected to the first differential transmission line at the end surface of the printed circuit board; and
 wherein in at least one segment of the three signal lines of the differential transmission line connector, the three signal lines are positioned at the apexes of an equilateral triangle in an plane that substantially perpendicularly intersects the longitudinal direction of those three signal lines.
(Attachment 6)
The differential transmission line connector according to either attachment 3 or 4,
 wherein the three signal lines of the first differential transmission line are formed in a plurality of conductor layers of a printed circuit board that is a multilayer board, and extend up to an end surface of the printed circuit board;
 wherein the differential transmission line connector is connected to the first differential transmission line at the end surface of the printed circuit board; and
 wherein the three signal lines of the differential transmission line connector are positioned at the apexes of an equilateral triangle in an plane that substantially perpendicularly intersects the longitudinal direction of those three signal lines.
(Attachment 7)
The differential transmission line connector according to any one of attachments 2 through 4,
 wherein the three signal lines of the first differential transmission line are formed in a plurality of conductor layers of a printed circuit board that is a multilayer board;
 wherein the differential transmission line connector is connected to the first differential transmission line at the upper surface of the printed circuit board; and
 wherein in at least one segment of the three signal lines of the differential transmission line connector, the three signal lines are positioned at the apexes of an equilateral triangle in an plane that substantially perpendicularly intersects the longitudinal direction of those three signal lines.
(Attachment 8)
The differential transmission line connector according to attachment 7,
 wherein the three signal lines of the differential transmission line connector are provided with a segment that is substantially perpendicular to the upper surface of the printed circuit board, and a segment that is substantially parallel to the longitudinal direction of the second differential transmission line.

With the differential transmission line connector of the invention, it is possible to keep the length of the three signal lines within the connector the same, when connecting different differential transmission lines each with three signal lines via the connector, and thus multiple differential transmission with little unwanted radiation noise is achieved without causing delays in the signals of the signal lines.

What is claimed is:

1. A differential transmission line connector that is used in a multiple differential transmission system and that is for connecting first and second differential transmission lines that are each provided with three signal lines and that perform multiple transmission of a group of three differential signals, comprising:
 a signal transmitter and a signal receiver;
 wherein the signal transmitter is connected to a differential transmission path that has first, second, and third signal lines, and comprises:
 a first differential driver that transmits a first output signal, and an inverted first output signal that is a phase inverted signal of the first output signal, in response to a first bit information signal;
 a second differential driver that transmits a second output signal, and an inverted second output signal that is a phase inverted signal of the second output signal, in response to a second bit information signal; and a third differential driver that transmits a third output signal, and an inverted third output signal that is a phase inverted signal of the third output signal, in response to a third bit information signal;

wherein the signal transmitter synthesizes the first output signal and the inverted third output signal and transmits the result to the first signal line, synthesizes the second output signal and the inverted first output signal and transmits the result to the second signal line, and synthesizes the third output signal and the inverted second output signal and transmits the result to the third signal line; and wherein the absolute value of the binary signal voltage of the first output signal and the absolute value of the binary signal voltage of the second output signal are identical, and the absolute value of the binary signal voltage of the third output signal and absolute value of the binary signal voltage of the first output signal are different;

wherein the signal receiver is connected to the differential transmission path, which has the first, second, and third signal lines, and comprises:

a first differential receiver that detects a polarity of a terminal voltage that is generated in a first terminal resistor that is connected between the first signal line and the second signal line, and outputs the result of that detection as a first bit information signal;

a second differential receiver that detects a polarity of a terminal voltage that is generated in a second terminal resistor that is connected between the second signal line and the third signal line, and outputs the result of that detection as a second bit information signal;

a third differential receiver that detects a polarity of a terminal voltage that is generated in a third terminal resistor that is connected between the third signal line and the first signal line, and outputs the result of that detection as a third bit information signal;

a comparison unit of determining whether or not the absolute value of the third terminal voltage that is generated in the third terminal resistor exceeds a predetermined threshold voltage; and a control unit of outputting the first, second, and third bit information signals that are output from the first, second, and third differential receivers, when the absolute value of the third terminal voltage exceeds the predetermined threshold voltage, and outputting a 0 or 1 for all of the first, second, and third bit information signals, depending on the third bit information signal that is output from the third differential receiver, when the absolute value of the third terminal voltage does not exceed the predetermined threshold voltage; and wherein the threshold voltage is set so that it is larger than the absolute value of the difference between the absolute value of the binary signal voltage of the first output signal and the absolute value of the binary signal voltage of the third output signal;

wherein in a plane that perpendicularly intersects the longitudinal direction of the first differential transmission line, the three signal lines of the first differential transmission line are positioned at the apexes of a first triangle;

wherein in a plane that perpendicularly intersects the longitudinal direction of the second differential transmission line, the three signal lines of the second differential transmission line are positioned at the apexes of a second triangle; and wherein the differential transmission line connector is provided with three signal lines that connect, at identical lengths, the three signal lines of the first differential transmission line and the three signal lines of the second differential transmission line, between a predetermined first plane of the planes that perpendicularly intersect the longitudinal direction of the first differential transmission line and a predetermined second plane of the planes that perpendicularly intersect the longitudinal direction of the second differential transmission line.

2. The differential transmission line connector according to claim 1,
wherein at least one of the first triangle and the second triangle is an equilateral triangle.

3. The differential transmission line connector according to claim 1,
wherein both the first triangle and the second triangle are equilateral triangles.

4. The differential transmission line connector according to claim 3,
wherein a length of edges of the first triangle is different from a length of edges of the second triangle.

5. The differential transmission line connector according to claim 2,
wherein the three signal lines of the first differential transmission line are formed in a plurality of conductor layers of a printed circuit board that is a multilayer board, and extend up to an end surface of the printed circuit board;
wherein the differential transmission line connector is connected to the first differential transmission line at the end surface of the printed circuit board; and
wherein in at least one segment of the three signal lines of the differential transmission line connector, the three signal lines are positioned at the apexes of an equilateral triangle in an plane that substantially perpendicularly intersects the longitudinal direction of those three signal lines.

6. The differential transmission line connector according to claim 3,
wherein the three signal lines of the first differential transmission line are formed in a plurality of conductor layers of a printed circuit board that is a multilayer board, and extend up to an end surface of the printed circuit board;
wherein the differential transmission line connector is connected to the first differential transmission line at the end surface of the printed circuit board; and
wherein the three signal lines of the differential transmission line connector are positioned at the apexes of an equilateral triangle in an plane that substantially perpendicularly intersects the longitudinal direction of those three signal lines.

7. The differential transmission line connector according to claim 2,
wherein the three signal lines of the first differential transmission line are formed in a plurality of conductor layers of a printed circuit board that is a multilayer board;
wherein the differential transmission line connector is connected to the first differential transmission line at the upper surface of the printed circuit board; and
wherein in at least one segment of the three signal lines of the differential transmission line connector, the three signal lines are positioned at the apexes of an equilateral triangle in an plane that substantially perpendicularly intersects the longitudinal direction of those three signal lines.

8. The differential transmission line connector according to claim 7,
wherein the three signal lines of the differential transmission line connector are provided with a segment that is substantially perpendicular to the upper surface of the printed circuit board, and a segment that is substantially parallel to the longitudinal direction of the second differential transmission line.

* * * * *